(12) United States Patent
John et al.

(10) Patent No.: US 7,403,993 B2
(45) Date of Patent: Jul. 22, 2008

(54) SYSTEM AND METHOD FOR HIGHLY-SCALABLE REAL-TIME AND TIME-BASED DATA DELIVERY USING SERVER CLUSTERS

(75) Inventors: Ranjit John, Sunnyvale, CA (US);
Satish N. Menon, Sunnyvale, CA (US);
Laxmi Thota, Cupertino, CA (US);
James Wang, San Jose, CA (US);
Jayakumar Muthukumarasamy, Dublin, CA (US); Robert Horen, Pleasanton, CA (US)

(73) Assignee: Kasenna, Inc., Mountain View, CA (US)

( * ) Notice: Subject to any disclaimer, the term of this patent is extended or adjusted under 35 U.S.C. 154(b) by 0 days.

(21) Appl. No.: 10/205,476

(22) Filed: Jul. 24, 2002

(65) Prior Publication Data
US 2004/0088412 A1  May 6, 2004

(51) Int. Cl.
*G06F 15/173* (2006.01)
*G06F 15/16* (2006.01)

(52) U.S. Cl. ..................... 709/226; 709/232

(58) Field of Classification Search .......... 709/231, 709/203, 226, 219, 273, 223, 244, 227, 232; 718/105; 725/115; 455/3.04
See application file for complete search history.

(56) References Cited

U.S. PATENT DOCUMENTS

| | | | | | |
|---|---|---|---|---|---|
| 5,586,264 | A | * | 12/1996 | Belknap et al. | 725/115 |
| 5,603,058 | A | * | 2/1997 | Belknap et al. | 710/35 |
| 5,682,597 | A | * | 10/1997 | Ganek et al. | 455/3.04 |
| 5,737,747 | A | * | 4/1998 | Vishlitzky et al. | 711/118 |
| 5,892,913 | A | * | 4/1999 | Adiga et al. | 709/219 |
| 5,933,849 | A | * | 8/1999 | Srbljic et al. | 711/118 |
| 6,006,264 | A | * | 12/1999 | Colby et al. | 709/226 |
| 6,026,425 | A | * | 2/2000 | Suguri et al. | 718/105 |
| 6,094,706 | A | | 7/2000 | Factor et al. | |
| 6,131,095 | A | | 10/2000 | Low et al. | |
| 6,223,210 | B1 | * | 4/2001 | Hickey | 709/203 |
| 6,343,298 | B1 | | 1/2002 | Savchenko et al. | |
| 6,377,996 | B1 | * | 4/2002 | Lumelsky et al. | 709/231 |
| 6,801,949 | B1 | * | 10/2004 | Bruck et al. | 709/232 |
| 2002/0049846 | A1 | * | 4/2002 | Horen et al. | 709/226 |

(Continued)

OTHER PUBLICATIONS n4 Streaming Media System [online], Nov. 2000. Retrieved from the Internet: http://www.ncube.com.

(Continued)

*Primary Examiner*—Saleh Najjar
*Assistant Examiner*—Benjamin R Bruckart
(74) *Attorney, Agent, or Firm*—Perkins Coie LLP

(57) ABSTRACT

The present invention provides loosely-coupled cluster systems comprising a plurality of servers based on storage attached to the plurality of servers. Videos, or other assets, are automatically replicated within the server system to increase the number of concurrent play requests serviceable. The server systems can detect spikes in demand that may exceed the guaranteed number of concurrent play requests serviceable and dynamically transfer the high-in-demand or 'hot' asset to servers in the cluster that do not have the video. Alternatively, instead of transferring the entire asset, varying length prefixes of the asset may be transferred depending on the availability of resources. The remainder of the asset is transferred in some embodiments on demand with sufficient buffering or other storage to guarantee playback to the user or subscriber according to the required quality of service (QOS).

61 Claims, 13 Drawing Sheets

U.S. PATENT DOCUMENTS

| | | | |
|---|---|---|---|
| 2002/0078203 A1* | 6/2002 | Greschler et al. | 709/225 |
| 2002/0078456 A1* | 6/2002 | Hudson et al. | 725/60 |
| 2002/0103928 A1* | 8/2002 | Singal et al. | 709/238 |
| 2002/0152318 A1* | 10/2002 | Menon et al. | 709/231 |
| 2002/0161868 A1* | 10/2002 | Paul et al. | 709/221 |
| 2003/0018978 A1 | 1/2003 | Singal et al. | |
| 2003/0037331 A1* | 2/2003 | Lee | 725/32 |

OTHER PUBLICATIONS

Oracle9i Real Application Clusters: Cache Fusion Delivers Scalability. Oracle White Paper [online], May 2001.

SeaChange MediaCluster: New Paradigm for Digital Video Storage & Delivery. SeaChange International White Paper [online], [retrieved Aug. 26, 2002]. Retrieved from the Internet: http://www.seachangeinternational.com.

Avid Edge Clusters/ Now Serving: A Dynamic Internet [online]. Retrieved from the Internet: http://www.avid.com.

Fan, Li, et al., Summary Cache: A Scalable Wide-Area Web Cache Sharing Protocol. SIGCOMM 98.

Wessels, D. and K. Claffy, Internet Engineering Task Force Request for Comments: 2186 [online], Sep. 19, 1997. Retrieved from the Internet: http://www.ietf.org.

Sen, S., et al., "Proxy Prefix Caching for Multimedia Streams", *IEEE*, 1999, 0-7803-5420-6/99.

* cited by examiner

Acquisition & Management Cluster

Streaming Clusters

SYSTEM AND METHOD FOR HIGHLY-SCALABLE REAL-TIME AND TIME-BASED DATA DELIVERY USING SERVER CLUSTERS

FIELD OF THE INVENTION

The invention relates generally to server systems and methods for serving content and more particularly to server systems and methods that facilitate real-time and time-based media streaming and hot-spot or high-demand asset management particularly for streaming DVD quality video content assets.

BACKGROUND

In order to deliver (or stream) real-time or time-based data from a server system to an end-user system, a number of system resources must be tightly managed. Typically, a video server system comprises video server hardware and software while an end-user system refers to a set-top box and TV, Personal Computer (PC), or other user device. Resources that must be tightly managed include Input/Output (I/O) resources such as disk drive (or other storage media) space and disk drive (or other storage media) bandwidth, CPU resources, memory, and network bandwidth.

Real-time and/or time-based media streaming, such as video streaming or video-on-demand (for example, movie, music, or other multi-media on-demand on a settop-box or other device connected to a television set or other receiver) is an extremely cost-sensitive business. Because of the bandwidth required to deliver a high quality video stream (typically 3 to 8 Megabits/second/user), these applications place tremendous load on the video server's memory, disk (or other storage media) and network subsystems. When such an application scales from serving a few users (for example, tens to hundreds) to very large numbers of users (for example hundreds of thousands or millions), the total solution cost, using today's technologies become cost-prohibitive. Business economics for example may initially benefit from a small low cost system that can service a limited number of users or subscribers. As the number of users or subscribers grows the initial system is augmented to add additional capacity. Desirably the initial system is retained and the initial system architecture is retained and scaled to serve the larger set of users.

Typical video-on-demand deployments start small and grow. A small server system capable of serving a few hundred users eventually must become part of a larger system that serves hundreds of thousands. Heretofore, there have generally been two approaches that have been taken to address this system size or system capacity scaling problem: (1) Deployment and use of tightly-coupled multiprocessor systems delivering a large number of streams, and (2) Loosely coupled clusters that are composed of small, off-the-shelf computers, but connected using standard computer networks.

Examples of these types of configuration are described relative to FIG. 1 and FIG. 2. With reference to FIG. 1, there is illustrated a portion of one embodiment of a tightly-coupled multiprocessor system, server 50, delivering a large number of streams. Server 50 has the capacity for a large number of processors, usually embodied as processor boards. Accordingly, server 50 comprises a plurality of slots, such as slots 60, 62, 64, 66, and 68. In one embodiment, server 50 has 256 slots, and is therefore capable of comprising 256 processor boards. Typically, server 50 begins service with a few processor boards, such as boards 70, 72, and 74, and boards are added as the system grows. Such a system tends to be very costly and does not usually meet the strict cost constraints placed by business. There is also the potential for failure of one board, such as processor board 72, to cause total failure of server 50. Further, as the system grows, the cost of computational power decreases, and the processor boards required to update the system may be outdated by the time a system administrator is prepared to grow the server system.

Examples of the loosely coupled clusters that are composed of small, off-the-shelf computers, but connected using standard network may for example use Gigabit Ethernet or Fiberchannel networking and use software to manage the collection of systems as a single entity capable of meeting some scalability and quality of service requirements. An exemplary system according to this loosely coupled cluster concept is illustrated in FIG. 2. FIG. 2 depicts servers 80 and 82 operating together as a cluster, receiving requests from load balancer 79 (a Layer 4 switch). Servers 80 and 82 each have access to all assets—including asset 86, asset 88, and asset 90 through fiber-channel switch 84. The shared storage includes additional components—fiber-channel switches, switch adapters, disks that are fiber-channel capable, etc. All are additional cost components and add complexity to the scalability of the network.

In addition, the shared storage cluster shown in FIG. 2 does not solve the resource management problem. For example, a video stored on a disk attached to a shared fiber channel switch still has its limitations on the amount of bandwidth available from the disk or through a fiber channel link. Thus, if a particular asset, or video, becomes in high-demand or is "hot" (where a lot of subscribers are requesting the video simultaneously and exceeding any disk's capacity to serve it or any one server's capacity in terms of disk or network bandwidth, to serve it), additional mechanisms are required to handle it. Many conventional systems attempt to copy high-demand or 'hot' assets onto switch memory or server physical memory 84 for faster access. However, these schemes fail beyond a certain size file or asset, as the system resource requirements become prohibitive for large video files.

Further, conventional load balancing handles requests from client devices and spreads them across to various servers to effectively balance network bandwidth as well as connection overheads (usually in software). However, the present solutions fail to take into account the I/O problem—the problem that happens at the I/O subsystem where contention for a video file or for storage system video file retrieval bandwidth causes the disk subsystem to run out of resources.

This input/output problem is endemic to any time-based media (such as audio and video) and real-time content delivery, and is especially true for "high-quality" or "high-value" video content. For example, a typical movie for a movie-on-demand application generally needs to be delivered at 4 Mbps to 8 Mbps today and up to 20 Mbps for a high-definition (HD) system and over a period of 90 to 120 minutes. For such an application, continued availability of resources—such as disk or other storage subsystem bandwidth, memory, network bandwidth, and CPU resources—over a long period of time is required to deliver a video service. Customers simply will not subscribe to a paid service to see a full length movie at lower than broadcast quality and may not even be inclined to subscribe unless the movie is the quality of a DVD or equivalent movie.

This is in contrast to existing load balancing/cluster systems for solving computational problems or data delivery problems (such as serving web pages from a server cluster at an aggregation site). Computational clusters usually tax the disk subsystems very little whereas data clusters for non-time-based data (such as graphics images or web pages) tax the disk subsystem, but they do not have real-time delivery semantics associated with them. For example, users will generally tolerate parts of a web-page loading slowly whereas breakups in audio and video are considered less tolerable or intolerable. Subscribers simply will not subscribe to a video (movie) delivery service where the play is broken or erratic in time, or the required frame-rates (typically 24 or 30 frames/second) cannot be maintained.

A single copy of a video on a server's disk subsystem can only service a certain number of concurrent play requests. This number is typically limited to by the hard disk's bandwidth. For example, if a disk provides 30 Megabytes of bandwidth for read/write access, it implies that it can support delivery of videos encoded at 5 Megabits/second to 48 users concurrently ((30 Megabytes×8 bits/byte)/5 Megabits/second=48 per second). Striping techniques, where a file system is built on top of a number of such disks, increase the number of concurrent users. However, there is an upper limit to the number of concurrent users the subsystem can server. When a video (or other content) becomes "popular", more copies of that video need to be provided to increase the concurrent number of plays available given the disk drive bandwidth. (Note that this disk drive bandwidth requirement is entirely different from disk drive storage capacity.) If the relative popularity of the video is known, a predetermined number of copies can be provided. However, dynamic spikes in interest or demand for a particular video movie or other real-time deliverable video content item may occur in a real-time streaming system.

Accordingly, there is a need in this art for a scalable server system, method, architecture, and topology that is able to cost-effectively, timely, and easily increase the number of users serviceable. Such a system should be viable for time-based media delivery, including streaming of broadcast, DVD, and HD movie quality video.

There is a further need in this art for a server system, method, architecture, and topology capable of managing system resources and load balancing to effectively provide real-time asset streaming, including streaming of broadcast and DVD movie quality video assets. Management of resources would extend to disk management, CPU management, memory management, and network bandwidth management.

There is still a further need in this art for a server system, method, architecture, and topology capable of dynamically adjusting to content delivery service demand in a real-time system. That is, a server system capable of automatically and dynamically increasing its capacity for playing out a specific asset, such as a specific video movie, when demand for that asset increases.

SUMMARY

The invention provides system, apparatus, method, computer program and computer program product, and business method and model for distribution of media assets to users or subscribers. The inventive system and method are highly scalable architecturally and on a dynamic demand basis.

In one aspect the present invention provides loosely-coupled cluster systems comprising one or a plurality of servers based on storage attached to the server(s). In another aspect, videos, or other assets, are automatically replicated within the server system to increase the number of concurrent play requests serviceable. In another aspect, the server systems can detect spikes in demand that may exceed the guaranteed number of concurrent play requests serviceable and dynamically transfer the high-in-demand or 'hot' asset to servers in the cluster that do not have the asset. Alternatively, instead of transferring the entire asset, varying length prefixes of the asset may be transferred depending on the availability of resources. The remainder of the asset is transferred in some embodiments on demand with sufficient buffering or other storage to guarantee playback to the user or subscriber according to the required quality of service (QOS).

In one embodiment, the invention provides a server system for time-based media streaming comprising: a plurality of servers coupled for communication with each other, including a first server and second server, the first server comprising: a first computer-readable storage medium encoded with stored server information comprising asset information associated with the second server; a first computer-readable storage device associated with the first server encoded with first asset information; and a second computer-readable storage device associated with the second server encoded with second asset information.

In another embodiment, the invention provides a method for time-based streaming of assets, the method including: receiving a request for an asset at a first server; determining if the first server has the asset; determining if the first server has sufficient resources to stream the asset; streaming the asset while maintaining a time-base for the streamed asset if the first server has the asset and the first server has sufficient resources to stream the asset; and if the first server does not have the asset, or the first server does not have sufficient resources to stream the asset, attempting to identify a second server having the asset and sufficient resources to stream the asset; and forwarding the request to the identified second server.

In another embodiment, the invention provides a method for time-based streaming of assets and load-balancing, the method including: receiving a request for an asset at a first server having the asset and sufficient resources to stream the asset; streaming the asset while maintaining a time-base for the streamed asset if the first server has a first server load level less than a load threshold value; and if the first server has a load level greater than a load threshold level, the method further including: attempting to find a second server having the asset, sufficient resources to stream the asset, and a second server load level less than the first server load level; forwarding the request if the second server is located; and streaming the asset while maintaining a time-base for the streamed asset if the second server is not located.

In another embodiment, the invention provides a method for time-based streaming of assets, the method including: receiving a request for an asset at a first server; determining if the first server has the asset; determining if the first server has sufficient resources to stream the asset; and if the first server does not have the asset or the first server does not have sufficient resources to stream the asset, forwarding the request to a second server having the asset and sufficient resources to stream the asset; and if the first server has the asset and sufficient resources to stream the asset, determining if the first server has a load level less than a load threshold value; and if the first server has a first server load level less than a load threshold value, streaming the asset and maintaining a time-base for the streamed asset; and if the first server has a load level greater than a load threshold level, attempting to find a second server having the asset, sufficient resources to stream the asset, and a second server load level less than the first server load level; forwarding the request if the second server is located; and streaming the asset and maintaining a time-base for the streamed asset if the second server is not located.

The invention further provides various computer programs and computer program products adapted for execution on general purpose computers, servers, and information systems.

The invention also provides a business model and method for distribution of content and assets (such as video movies) as well as a business model and method for operating and growing a scalable content and asset distribution system.

In another embodiment, the invention provides a business model for operating a time-base accurate asset streaming business, the business model comprising: operating a first server to receive and service requests for an asset, the first server (i) receiving a request for an asset, (ii) determining if the first server has the asset available for time-base accurately streaming and has sufficient resources to time-base accurately stream the asset, and (iii) time-base accurately streaming the asset if it is determined that the first server has the asset available for time-base accurately streaming and has sufficient resources to time-base accurately stream the asset; and if the determining indicates that the first server does not have the asset available for time-base accurately streaming or does not have sufficient resources to time-base accurately stream the asset, then: (i) identifying a second server having the asset available for time-base accurately streaming and sufficient resources to time-base accurately stream the asset, and (ii) forwarding the request to the identified second server for servicing by the second server.

BRIEF DESCRIPTION OF THE DRAWINGS

The present invention may be better understood, and its features and advantages made apparent to those skilled in the art by referencing the accompanying drawings.

DETAILED DESCRIPTION OF THE EMBODIMENTS

Figure 1:
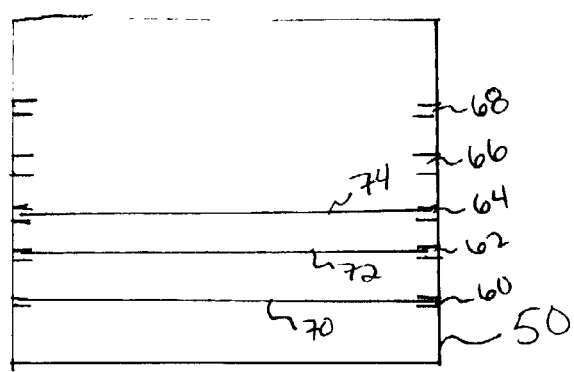
FIG. 1 is a diagrammatic illustration showing an embodiment of a tightly-coupled multiprocessor system, as known in the art.
Figure 2:
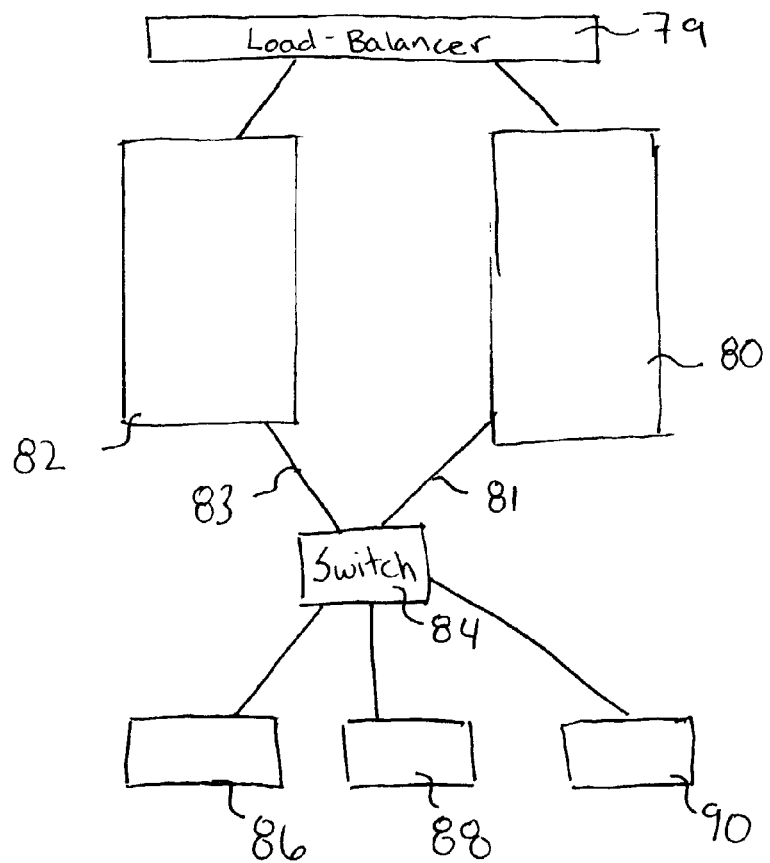
FIG. 2 is a diagrammatic illustration showing an embodiment of a general architecture of a loosely-coupled server system with a fiber switch, as known in the art.

Generally, the present invention provides loosely-coupled cluster systems comprising a plurality of servers based on storage directly attached to the plurality of servers. Videos, music, multi-media content, or other assets, are replicated within the server system to increase the number of concurrent play requests for the videos, music, multi-media content, or other assets serviceable. For convenience these various videos, movies, music, multi-media content or other assets are referred to as video or movies as these are the most prevalent types of assets; however, it should be clear that references to any one of these asset or content types, such as to video or movies, refers to each of these other types of content or asset as well.

In some embodiments, the server systems detect spikes in demand that may exceed the guaranteed number of concurrent play requests serviceable. In some embodiments, the server systems dynamically replicate the 'hot', high-demand or frequently requested asset to servers in the cluster that do not have the video. (High-demand or frequently requested assets are conveniently referred to as "hot" or as "hot-assets" in this description.) Alternatively, instead of replicating the entire asset, varying length "prefixes", or initial portions, of the asset may be replicated depending on the availability of resources. The remainder of the asset is transferred in some embodiments on demand with sufficient buffering or other storage to guarantee playback to the user or subscriber according to the required quality of service (QOS). Assets as used herein generally refers to data files. Assets stored on, and streamed by, server systems discussed herein preferably comprise real-time or time-based assets, and more preferably comprise video movies or other broadcast, DVD, or HD movie quality content, or multi-media having analogous video movie component. It will also be appreciated that as new and different high-bandwidth content assets are developed such high-bandwidth content assets benefiting from real-time or substantially real-time play may also be accommodated by the inventive system and method.

Accordingly, the present invention provides a server system, method, architecture, and topology for real-time and time-base accurate media streaming. The terms real-time and time-base or time-base accurate are generally used interchangeably in this description as a real-time play generally meaning that streaming or delivery is time-base accurate (it plays at the designated play rate) and is delivered according to some absolute time reference (that is there is not too much delay between the intended play time and the actual play time). In general, real-time play is not required relative to a video movie but real-time play or substantially real-time play may be required or desired for a live sporting event, awards ceremony, or other event where it would not be advantageous for some recipients to receive the asset with a significant delay relative to other recipients. For example, it is desirable that all requesting recipients of a football game would receive both a time-base accurate rendering or play out and that the delay experienced by any recipient be not more than some predetermined number of seconds (or minutes) relative to another requesting recipient. The actual time-delay for play out relative to the live event may be any period of time where the live event was recorded for such later play. In one embodiment, a requestor selecting such event asset play during delayed live play out may choose between beginning play at the start of the asset or joining the asset play synchronized with the pay to other requesting recipients.

Streaming, as used herein, generally refers to distribution of data. Aspects of the invention further provide computer program software/firmware and computer program product storing the computer program in tangible storage media. By real-time (or time-based) streaming, herein is meant that assets stored by or accessibly by the server system are generally transmitted from the server system at a real-time or time-base accurate rate. In other words the intended play or play out rate for an asset is maintained precisely or within a predetermined tolerance. Generally, for movie video streaming using compression technology available today from the Motion Pictures Expert Group, (MPEG), a suitable real-time or time-base rate is 4 to 8 Megabits/second, transmitted at 24 or 30 frames/second. Real-time or time-base asset serving maintains the intended playback quality of the asset. It will be appreciated that in general, service or play of an ordinary Internet web page or video content item will not be real-time or time-base accurate and such play may appear jerky with a variable playback rate. Even where Internet playback for short video clips of a few to several seconds duration may be maintained, such real-time or time-base accurate playback cannot be maintained over durations of several minutes to several hours.

Server systems according to the present invention may be described as or referred to as cluster systems, architectures, or topologies. That is, the server systems comprise a plurality of servers in communication (electrical, optical, or otherwise) with each other. A variety of servers for use with the present invention are known in the art and may be used, with MediaBase servers made by Kasenna, Inc. of Mountain View, Calif. being particularly preferred. Aspects of server systems and methods for serving media assets are described in co-pending U.S. patent application Ser. No. 09/916,655 filed Jul. 27, 2001 entitled *Improved Utilization of Bandwidth in a Computer System Serving Multiple Users*; U.S. patent application Ser. No. 08/948,668 filed Oct. 14, 1997 entitled *System For Capability Based Multimedia Streaming over A Network*; and U.S. patent application Ser. No. 10/090,697 filed Mar. 4, 2002 entitled *Transfer File Format And System And Method For Distributing Media Content*; each of which applications are hereby incorporated by reference.

Each server within the server system generally comprises at least one processor and is associated with a computer-readable storage device, such as a disk or an integrated memory or other computer-readable storage media, which stores asset information. Asset information generally comprises all or part of the asset, or metadata associated with the asset, as described more fully below. A plurality of processors, such as two, three, four, five, six, seven, eight, or more processors or microprocessors may be utilized in any given server. Each server within the system further has access to "load" information about other servers within the system, or cluster. Load information is discussed further below. When receiving a request, then, each server can decide whether to serve or play the requested asset itself, or to transfer the request to another server that has the asset. When choosing where to route the request, if the server is going to transfer the request, the server may take into account load information about the other servers, as well as what type of asset information the other servers have (the entire asset, a prefix of the asset, or metadata, and the like). If the server receiving the request does not have the requested asset, it can transfer the request to another server that does have the asset, or request the asset from a shared (or otherwise accessible) storage device. In some embodiments, a system administrator, or other source, may provide a load threshold value, as discussed further below. Servers within the cluster have access to the load threshold value. When a first server receives a request and has a load greater than the load threshold value, it will attempt to locate another, less loaded, server to service the request even if the first server has the asset and is able to service the request.

The present invention further provides methods and systems and computer program and computer program product for hot (or high-demand) asset management. That is, a system administrator, or other source, may provide a hot (or high-demand) asset count and a hot (or high-demand) asset time period. The server system, or cluster, keeps track of the number of requests received for a given asset. If the number of requests exceeds the hot asset count within the hot (or high-demand) asset period, the asset is deemed 'hot' or in high-demand, and a server having access to the asset can make a copy onto another server that does not have access to the asset. By 'have the asset' herein is generally meant that the server has asset information associated with the requested asset, such as all or a portion of the asset, stored in its direct attached or integrated storage device or memory. Alternatively, a first server, upon determining that an asset is hot, may copy a variable length prefix of an asset to a second server that does not have the asset. Upon receiving a request for that asset, the second server can request the entire asset from the first server. The idea is that the system monitors interest in or demand for the asset, such as a video movie, and when it appears that the interest or demand is such that the demand on the server will exceed its storage device service bandwidth capacity, it creates another service process to provide for the expected demand. Systems, methods, and computer programs according to the present invention are discussed in further detail below.

A server cluster according to embodiments of the present invention comprises a plurality of servers working together to service a request. The plurality of servers may have independent disks, or other computer readable storage devices, or share disks through a file system over a shared storage system, such as networked attached storage (NAS) or a storage area network (SAN). Operationally, the cluster may be deployed at the origin site, where the original assets reside, or at an edge where a server is primarily used as a streaming media cache.

In some embodiments, the front end of the cluster is a load-balancing component that directs user request to one of the servers within the cluster, or system. In preferred embodiments, the load-balancing component comprises a Layer 4 switch. In other embodiments, the load-balancing component comprises a software load balancing proxy or round-robin DNS. These and other load-balancing components are known in the art. In further preferred embodiments of the present invention, no load-balancing component is necessary, and the load-balancing is effectively performed by a server receiving user requests, which forwards or accepts the requests as appropriate, and as described further below. In such embodiment, a Level 2 switch may be provided as an interface to the servers within the cluster. It will be appreciated that the cost of a simple Layer 2 switch is a faction of the cost of a Layer 4 load-balancer so that embodiments of the invention provide considerable cost savings and economies over those embodiments requiring external load-balancers.

Figure 3:
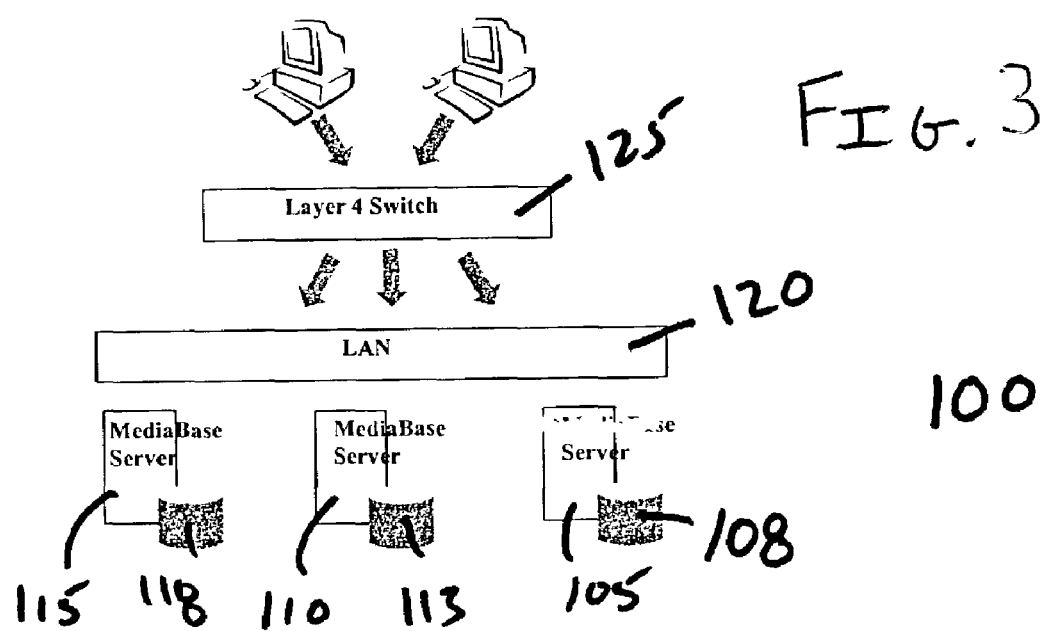
FIG. 3 is a diagrammatic illustration showing an embodiment of a cluster system with direct attached storage, according to an embodiment of the present invention.

In a first preferred embodiment, depicted schematically in FIG. 3, cluster system 100 is provided comprising a plurality of servers including server 105, server 110, and server 115. A variety of suitable media servers are known in the art, with MediaBase servers (Kasenna, Inc.; Mountain View, Calif.) being particularly preferred. Servers 105, 100, and 115 each comprise a computer-readable storage medium encoded with a computer program module that, when executed by at least one processor, enables the server to broadcast load information, receive and store load information, and/or provide the load balancing and hot-asset management functionalities described further below. Alternatively, these functionalities may be provided by a plurality of computer program modules. Each server is associated with its own independent storage—computer-readable storage device 108, 113, and 118, respectively. Servers 105, 110, and 115 are in communication with one another. In system 100, servers 105, 110, and 115 are in communication via local area network (LAN) 120. In other embodiments, servers 105, 110, and 115 are in communication via a LAN for streaming, and have a separate connection (for example, a direct or wireless connection) for messaging amongst each other. In other embodiments, servers 105,110, and 115 are in communication via a wide area network (WAN). Other communication means and/or protocols may be utilized as are known in the art for coupling computers, networks, network devices, and information systems.

User requests come to cluster 100 as, for example, a hypertext transport protocol (HTTP) or real time streaming protocol (RTSP) request, although a variety of other protocols known in the art are suitable for forming user requests. The requests are directed via load-balancing component 125, shown as a Layer 4 switch in FIG. 1, to one of the servers in the cluster. In other embodiments, load-balancing component 125 is not present and user requests are received directly by one or a plurality of servers in cluster 100. Media assets reside on local disks including disk 108, 113, and 118. Media assets, as discussed above, are preferably data files requiring real-time delivery, and more preferably video files. Generally any media format may be supported with MPEG-1, MPEG-2, and MPEG-4 formats being preferred. The cluster replication policy can range from no replication to partial to full replication. Installing an asset into the cluster generally requires an administrator, or other authorized user, to determine which server or servers should host the asset and install the asset on those servers. Adding additional servers preloaded with asset information can increase the throughput of cluster 100.

Accordingly, in one embodiment of cluster 100, by way of example, 1000 media assets are stored (in fact any number of media assets may be stored). If the assets are high quality MPEG-2 format (encoded at 4 Mb/s) movies and if each asset is 2 hrs in length (a typical full length feature movie), approximately 4.5 gigabyte (GB) of storage is required per movie. The size and length of assets will vary accordingly to the specific asset stored, and the above numbers are given by way of example only. Cluster 100 therefore required 4.5 terabyte (TB) (4.5 GB×1000) of storage with no replication. Two-way replication would require 9 TB of storage. Accordingly, cluster 100 may comprise 12 servers each with around 800 GB of direct attached storage to support two-way replication. Each server would further be required to play out around 42 streams and the network required to have an aggregate serving bandwidth of 2 Gb/s (4 Mb/s×500) to support 500 users. These metrics and storage requirements will vary according to the size and length of stored assets, the encoding rate of the assets, the desired degree of replication, and the desired number of supported users. The above numbers are provided by way of example and are not intended to limit the invention.

Figure 4:
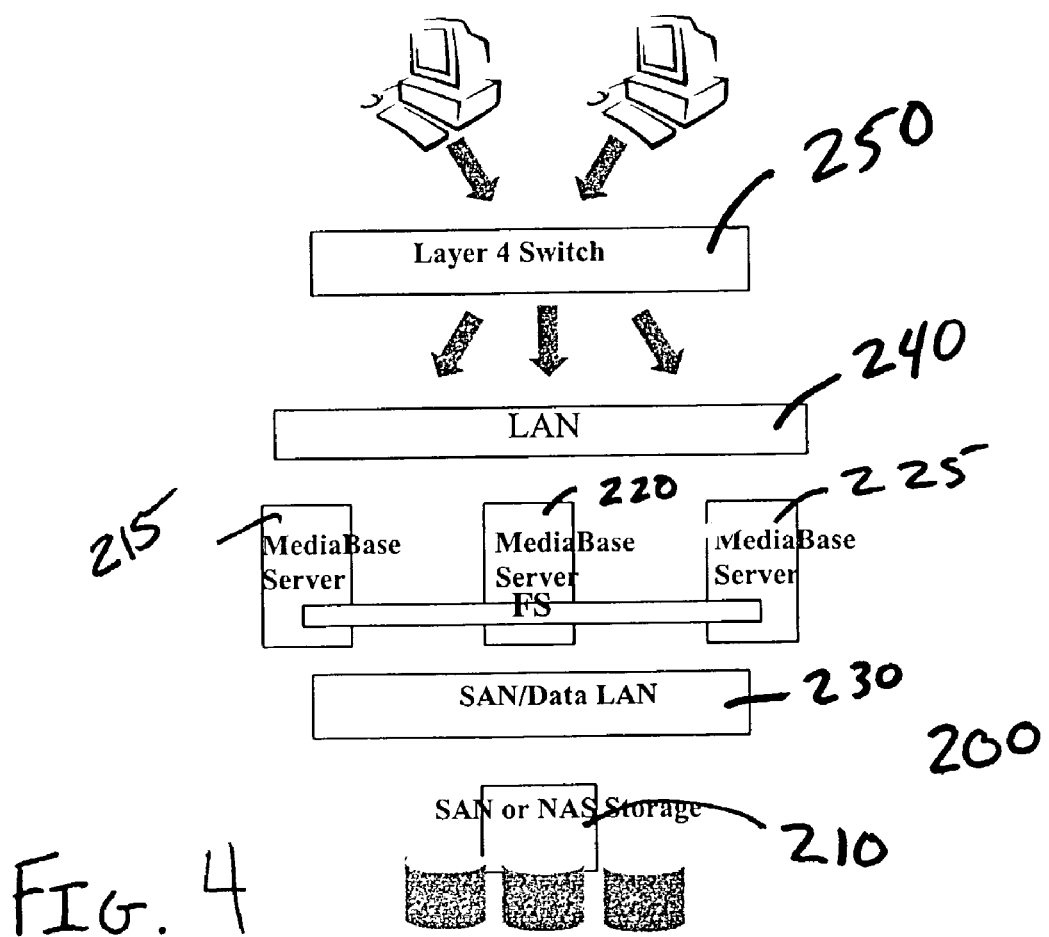
FIG. 4 is a diagrammatic illustration showing an embodiment of a cluster system with shared storage according to an embodiment of the present invention.

In another embodiment of the present invention, schematically depicted in FIG. 4, cluster 200 comprises shared storage system 210. Shared storage system 210 may comprise, for example a network attached storage (NAS) system, or a storage area network (SAN). Shared storage system 210 communicates to servers in cluster 200, such as server 215, 220, and 225 via network connection 230, such as a SAN or data local area network (LAN). In embodiments comprising a SAN, the SAN comprises its own data network. In some embodiments, the SAN data network comprises fiber switches and the like. In other embodiments network connection 230 comprises other components providing functionality to communicate between shared storage system 210 and servers 215, 220 and 225. As described above, server 215, 220 and 225 are in electronic communication through, for example, LAN 240. In preferred embodiments comprising a NAS, LAN 240 is the same as LAN 230. In other embodiments comprising a NAS, LAN 240 and LAN 230 are separate networks. In other embodiments, as discussed above, the servers are in direct communication or have a separate wireless connection. In still other embodiments, the servers have one communication network or link for asset transfer and streaming and a second communication network or link for messaging and communication amongst themselves. Servers 215, 220, and 225 each comprise a computer-readable storage medium encoded with a computer program module that, when executed by at least one processor, enables the server to broadcast load information, receive and store load information, and/or provide the load balancing and hot-asset management functionalities described further below. Alternatively, these functionalities may be provided by a plurality of computer program modules. Load-balancing component 250 may pass user requests to servers within cluster 200, as discussed above with reference to FIG. 1. In other embodiments, load-balancing component is unnecessary and not present.

In cluster 200, assets reside on shared storage system 210. Individual servers, such as server 215, 220, and 225 store asset metadata locally in direct attached, or integrated, storage. Metadata generally comprises information about an asset, such as a video, including encoding type, bit rate, duration, and/or the like. Installing an asset into cluster 200 generally involves installing the asset on the shared storage system and distributing the metadata associated with the asset to all the servers in the cluster. Generally, any server may be used to install an asset onto the shared storage system and copy the metadata to the rest of the servers in cluster 200.

Using the cluster example given above—providing 1000 high-quality MPEG-2 titles each lasting 2 hours with two-way replication and supporting 500 users—cluster 200 would require 4.5 TB of storage on the shared storage system. Using servers capable of playing out 125 streams, cluster 200 would require 4 servers. Further, the network between clients and servers required an aggregate bandwidth of (4 Mb/s×500) 2 Gb/s. The data network 230 between servers and storage would require a similar bandwidth. The actual required bandwidth, number of servers, and amount of required storage will vary according to the number, type and length of asset stored, number of servers utilized in cluster 200, and the desired number of supported users. The above numbers are given only by way of example.

Figure 5:
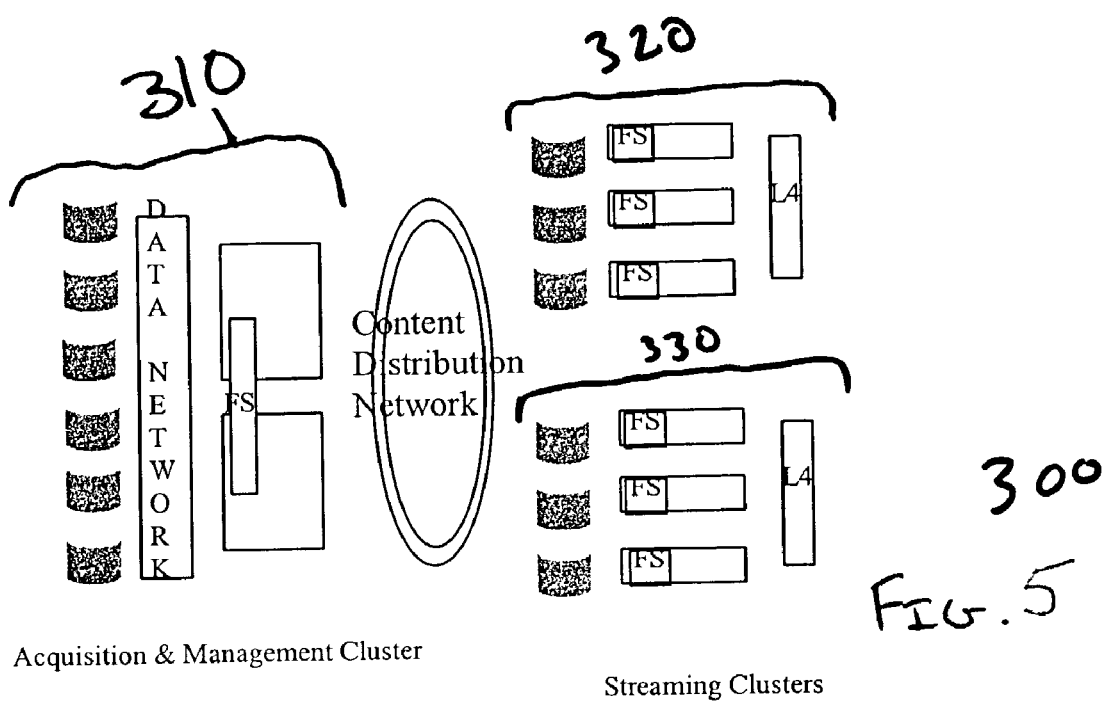
FIG. 5 is a diagrammatic illustration showing an embodiment of a cluster system with hierarchical storage according to an embodiment of the present invention.

In a third embodiment, shown schematically in FIG. 5, cluster 300 is provided comprising hierarchical storage. In this embodiment, assets reside at centrally administered server cluster 310 (the head end) and streaming occurs at the edges. An edge generally refers to a location in a server system that is closer to an end user. An edge server is a server located at an edge of a network and an edge cluster is a set of servers located at an edge. Edge streaming clusters, such as cluster 320 and 330 are similar to the direct attached storage embodiment, discussed above with regard to FIG. 1. In operation, if an asset is requested and is not found in an edge cluster, the asset is requested from higher levels of storage (i.e. from cluster 310). Cluster 310 and edge cluster 320 and 330 are in communication via a content distribution network, which may be another LAN. In some embodiments, the content distribution network is a WAN or other network connection, and the appropriate protocols and messaging systems are used to facilitate communication between inner clusters and edge clusters. In some embodiments, the content distribution network shares traffic with a network connection between edge servers, or between edge servers and end users. Servers within cluster 320 and 330 each comprise a computer-readable storage medium encoded with a computer program module that, when executed by at least one processor, enables the server to broadcast load information, receive and store load information, and/or provide the load balancing and hot-asset management functionalities described further below. Alternatively, these functionalities may be provided by a plurality of computer program modules.

In cluster 300, any server can generally be used to install an asset. Installation generally involves placing the asset in the headend and installing a metadata entry and a prefix associated with the asset in all the servers in the edge clusters, such as cluster 320 and 330.

Utilizing the cluster example above—providing 1000 high-quality MPEG-2 titles each lasting 2 hours with two-way replication and supporting 500 users—cluster 300 required 4.5 TB of storage at the headend. At the edges, assuming that each server caches 100 titles and stores a 5 percent prefix of all 1000 titles, each server would require 652.5 GB (100×4.5 GB+900×0.225 GB) of storage for the cache. Assuming that a server can play out 125 streams, cluster 300 would require 4 servers. The network between subscribers and edge clusters would need to have an aggregate bandwidth of 2 Gb/s (4 Mb/s×500). These metrics and storage requirements will vary according to the size and length of stored assets, the encoding rate of the assets, the desired degree of replication, and the desired number of supported users. The above numbers are provided by way of example and are not intended to limit the invention.

Choice of cluster configuration—direct attached storage as in cluster 100, shared storage as in cluster 200, or hierarchical storage as in cluster 300—depends on requirements as to cost, number of required streams, and number of supported users. It is anticipated that one configuration, such as cluster 200 may be implemented and later reconfigured into another configuration, such as cluster 300.

The above description recites various configurations of a cluster according to the present invention. Servers within the cluster contain at least one processor, and are configured to perform a variety of functionalities with respect to streaming assets, messaging between servers, and routing requests. These functionalities are generally provided as a service, herein referred to as a node agent (or "nodeagent"), that is embedded as a computer program module encoded in a computer-readable storage medium within a server and executed by one or more processors. The computer program module, or service or node agent as used herein, contains instructions that, when executed, provide the servers with a variety of messaging and/or other performance functionalities. These functionalities are discussed further below. A node agent may be implemented using any of a variety of computer program module protocols or languages as known in the art, with implementation as a Common Object Request Broker Architecture (CORBA™) service being particularly preferred. It is to be understood that a node agent may be implemented in any of the above described cluster embodiments, or the like. Particularly, a node agent may be installed on any, some, or all of servers 105, 110, 115 in FIG. 3, servers 215, 220, and 225 in FIG. 4, and servers within clusters 320 and 330 in FIG. 5.

A node agent generally exports an interface through which other services, or computer program modules, on the server or in communication with the server interact with the node agent. This interface may be any of a variety of interfaces as known in the art, for example, an Internet Inter-Orb Protocol (IIOP). In some embodiments, a plurality of interfaces are exported by the node agent, each interface for communication via a different protocol.

In some embodiments, the node agent further supports a message-based protocol built over a user datagram protocol (UDP) called the Intra Cluster Protocol (ICP), used for exchanging bootstrapping, load, and event notification messages between nodeagents in a cluster—that is, generally, between servers.

Figure 6:
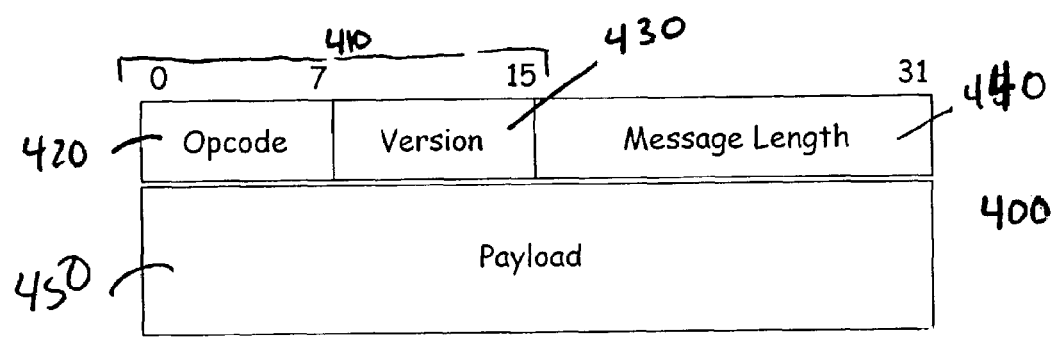
FIG. 6 is a diagrammatic illustration showing an embodiment of an Intra Cluster Protocol message format, according to an embodiment of the present invention.

The Intra Cluster Protocol (ICP) is an extension of the Internet Cache Protocol, as known in the art and described further in, for example "Internet Cache Protocol", version 2, Wessls, D. and Claffy, K., RFC 2186, September, 1997, hereby incorporated by reference herein. The Intra Cluster Protocol is used by the node agent for bootstrapping, load information exchange, asset inserts and delete notifications and failure detection. An embodiment of the Intra Cluster Protocol message format is shown schematically in FIG. 6. Briefly, message 400 comprises header 410 comprising operation code (opcode) field 420, version field 430 and data length field 440. Header 410 is preferably 4 bytes in length, although substantially any length may be chosen and implemented accordingly. Message 400 further comprises data field 450. Some opcodes used in preferred embodiments of message 400 are shown in Table 1. Other standard opcodes are supported in some embodiments, including ICP_INVALID, ICP_QUERY, ICP_HIT, ICP_MISS, and ICP_MISS_NOFETCH.

An I am alive opcode (I_AM_ALIVE) 525 is used to indicate a bootstrap message that is sent to inform servers that a first server is up and running. The message size is preferably 8 bytes, but may vary according to the specific protocol implemented. A peer opcode (PEER) 530 is sent as response to a message comprising the 'I am alive' opcode (I_AM_ALIVE) 525. As before, the message size is preferably 8 bytes, but may vary. A digest opcode (DIGEST) 535 is used to indicate a message used for exchanging summary caches, described further below. In embodiments where ICP messaging is used for server discovery (sending I_AM_ALIVE, PEER, and/or DIGEST messages), servers within the cluster should be on a same network subnet. This requirement is removed when another messaging protocol is chosen, as is known in the art. A load opcode (LOAD) 540 is used to indicate a message sent periodically to inform other servers about the load on a first server, as discussed further below. Preferably, the maximum message size is 8 bytes. An asset insert opcode (ASSET_INSERT) 545 indicates a notification message sent to inform other servers that an asset has been installed on a first server. Preferably, the maximum message size is 20 bytes plus the length of the asset name plus the length of the server name that has had the asset installed. An asset delete opcode (ASSET_DELETE) 550 indicates a message sent out to inform other servers that an asset has been deleted on a first server. Preferably, the maximum message size is 20 bytes plus the length of the asset name plus the length of the server name from which the asset has been deleted. A node shutdown opcode (NODE_SHUTDOWN) 555 indicates a message sent to inform other servers if a node has been shut down—by an administrator or otherwise. Preferably, the message size is 4 bytes. A cluster shutdown opcode (CLUSTER_SHUTDOWN) 560 indicates a message sent if an entire cluster is shut down_by an administrator or otherwise. Preferably, the message size is 4 bytes. A load frequency change opcode (LOAD_FREQ_CHANGE) 565 indicates a message informing other servers that the load frequency has been altered. Load frequency is discussed further below. Some servers use this type of message to reset their failure detection alarms in addition to or instead of alerting themselves that the load frequency is altered. Preferably, the message size is 8 bytes. An ICP interface change opcode (ICP_IF_CHANGE) 570 indicates a message to a server that the bootstrap interface has been changed, and it needs to listen and send on the new interface. Preferably, the message size is 4 bytes. The opcodes above, include preferred uses for the opcodes and preferred sizes of the associated messages are presented by way of example. However, it will be readily appreciated by those skilled in the art that any of a variety of opcodes may be designated for a particular message. Further, the above specific interfaces are presented by way of example and it will be readily appreciated by those skilled in the art that a variety of specific interfaces may be chosen and implemented to achieve the above-described communication pathways.

A variety of variables are available for describing the state of the node agent. These variables can be set by an administrator, or other source, and may be present encoded within a server at startup, or default values assumed by the node agent. The default values may be set by an administrator, or other source. According to one embodiment, on startup, the node agent checks to see if a node agent table (NodeAgentTbl) exists in a local database. That is, a server within a cluster generally maintains a node agent table describing its configuration. In other embodiments, agent tables are shared.

An exemplary embodiment of a node agent table (NodeAgentTbl) is shown as Table 2, along with some exemplary default values. It is to be understood that all or a portion of the described fields may be present in various embodiments of the node agent table. Briefly, field Cluster Mode 600 is associated with mode value or condition 601, such as Standby, indicating what mode the node agent is in. In one embodiment, a node agent operates in one of two modes— standby and cluster. In standby mode, the node agent operates as a server that streams video. In standby mode, the node agent does not know of other servers in a cluster and does not forward any requests. On activation to cluster mode, the server automatically discovers other servers in the cluster and will load balance play requests, as described further below.

Threshold value field 610, associated with threshold value 611, such as a value 70, is an optional but advantageous field and indicates a threshold load value. The determination of and use of this threshold value is discussed further below, however, briefly, this value indicates a load level above which a server will attempt to find another, less loaded, server in the cluster to service a request even if the first server has access to the requested asset and has sufficient resources to stream the asset. Generally, and as discussed further below, threshold value 611 ranges from 0 to 100 (typically scaled to represent a load level between 0% and 100% of some nominal, predetermined, or maximum load), although in other embodiments other ranges are possible, depending on the method used to calculated threshold value 611. In a preferred embodiment, a load threshold value represents an indication of the load on a server including considerations to: percent CPU used, available memory, and available network bandwidth. Other considerations are discussed further below.

In other embodiments, a plurality of threshold values are determined, each corresponding to a different server resource, and a plurality of threshold value fields appear in Table 2.

Bootstrap Interface field 620, associated with a Bootstrap Interface 621, such as first reported network interface.

Hot Object Count field 630, is associated with count value 630, for example, 60. Hot object counts are described further below. Hot Object Period Field 640, is associated with hot object period value 631, such as 60 seconds. In preferred embodiments, hot object period is represented in seconds and ranges from about 30 seconds to about 1800 seconds, although in some embodiments a longer or shorter time period will be used. Hot object periods are discussed further below. Briefly, if a number of requests for a first asset exceeds the hot object count during the hot object period (i.e. more than 60 requests in 60 seconds in this example), the asset is considered 'hot', and the server will attempt to copy the asset to another server which does not have direct access to the asset in order to increase the capacity of the cluster to stream the asset. Hot object count 630 and hot object period 640 may be entered by an administrator and may vary according to the presumed relative popularity of an asset.

Additionally, a plurality of hot object count fields and hot object period fields may appear in Table 2, each corresponding to a certain asset or group of assets.

Load Update Frequency field 650 is associated with a load update frequency 651, such as 5 seconds. Load update frequency 651 is discussed further below. Briefly, this indicates how often the server will broadcast load information about itself. Shorter periods increase the amount of messaging traffic between servers, while longer periods may result in a situation where other servers may have outdated or inaccurate information about the first server's load.

Accordingly, on startup, if a node agent table (NodeAgentTbl) does not exist in a database, the node agent (nodeagent) for the server creates the table with default values, in one preferred embodiment, the values are as shown in Table 2. If the node agent table exists, the nodeagent reads the values from the table and starts itself in the appropriate mode, given by Cluster Mode 601.

TABLE 1

Exemplary Opcodes and their uses.

| Opcode (reference #) | Use |
|---|---|
| I_AM_ALIVE (525) | Bootstrap message. Sent to inform other servers that a server is up. Message size is 8 bytes. |
| PEER (530) | Sent as response to an I_AM_ALIVE message. Message size is 8 bytes. |
| DIGEST (535) | Message is used for exchanging Summary Caches. |
| LOAD (540) | Periodic message sent out to inform other servers about load on server. Max size is 8 bytes. |
| ASSET_INSERT (545) | Notification message sent out to inform other servers that an asset has been installed on server. Max message size is 20 bytes + length of asset name + length of server name |
| ASSET_DELETE (550) | Notification message sent out to inform other servers that an asset has been deleted on server. Max message size is 20 bytes + length of asset name + length of server name |
| NODE_SHUT-DOWN (555) | Notification message sent out to inform others if a node has been administratively shut down. Message size is 4 bytes. |

TABLE 1-continued

Exemplary Opcodes and their uses.

| Opcode (reference #) | Use |
| --- | --- |
| CLUSTER_SHUT-DOWN (560) | Notification message sent out if an administrator decides to shut down entire cluster. Message size is 4 bytes. |
| LOAD_FREQ_CHANGE (565) | Notification message to inform other servers that the load frequency has been altered. Other servers use this message to reset their failure detection alarms. Message size is 8 bytes. |
| ICP_IF_CHANGE (570) | Notification message to server that the bootstrap interface has been changed and it needs to listen and send on the new interface. Message size is 4 bytes. |

TABLE 2

NodeAgentTbl exemplary fields and values

| Field | | Exemplary Value | |
| --- | --- | --- | --- |
| Cluster Mode | (600) | Standby | (601) |
| Threshold Value | (610) | 70 | (611) |
| Bootstrap Interface | (620) | First reported Network Interface | (621) |
| Hot Object Count | (630) | 60 | (631) |
| Hot Object Period | (640) | 60 seconds | (641) |
| Load Update Frequency | (650) | 5 seconds | (651) |

Additionally, values in the node agent table—including hot object count, hot object period, load update frequency, and load threshold value—may be dynamically updated during operation of the node agent, either upon request by a system administrator or other source, or automatically by the node agent in response to operating conditions. In a preferred embodiment, a system administrator is able to change one or more hot object count, hot object period, and threshold value using the cluster management console, described further below.

In preferred embodiments, on a cold start, that is where the server is configured for the first time, the node agent comes up in Standby mode. In this mode, the server can be monitored and administered, but it is not a member of a cluster—that is, it does not communicate or exchange load or asset information with other servers. The node agent can be activated to the Cluster mode by an administrator either directly at the server comprising the node agent, or remotely through a console. Activation is the process by which a node agent becomes part of a cluster. By 'part of a cluster' herein is meant generally that a server communicates—that is sends and receives messages—with other servers. The collection of servers sending and receiving each others messages is generally referred to as a cluster.

Figure 7:
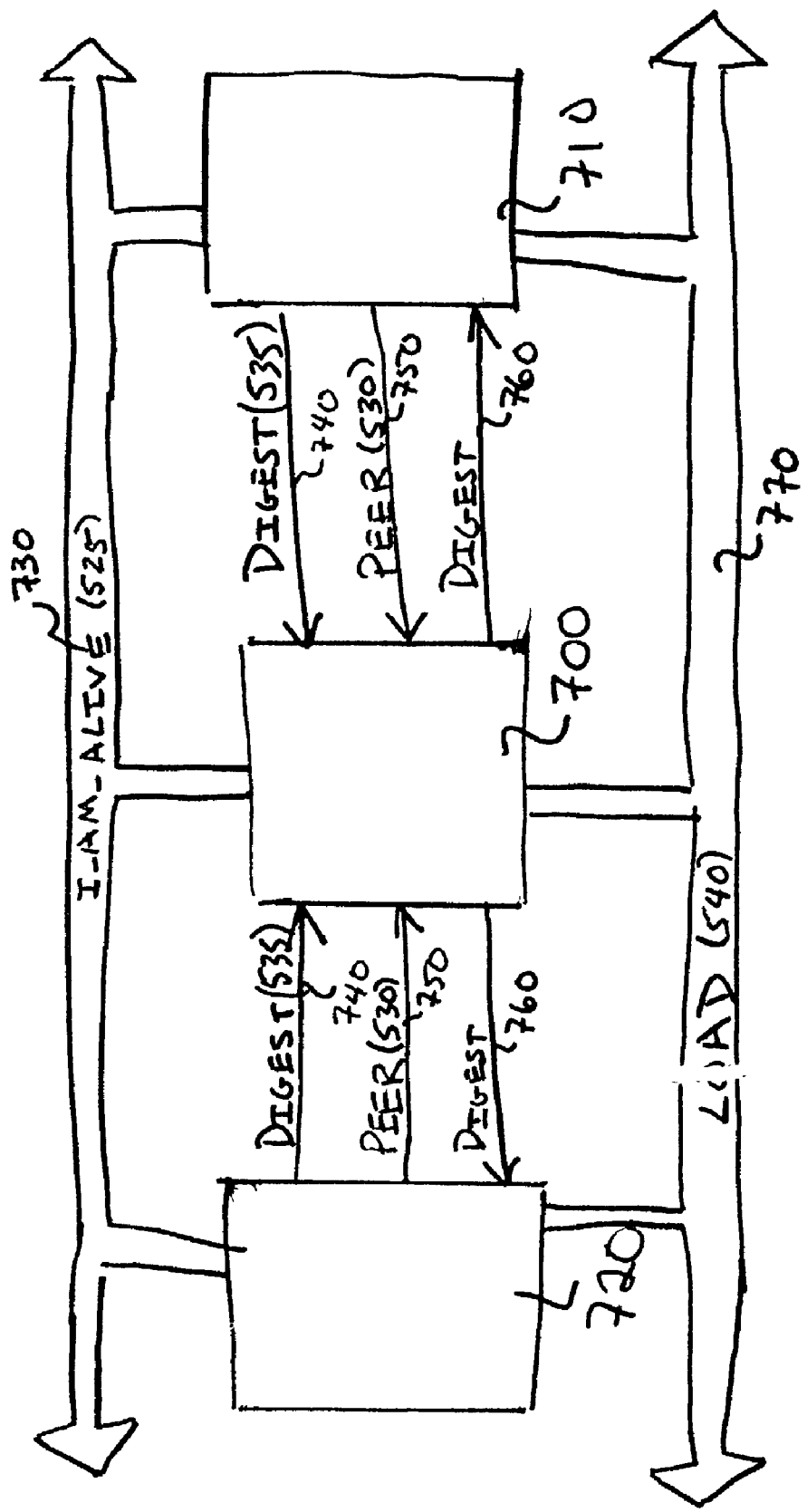
FIG. 7 is a diagrammatic illustration showing an embodiment of an activation process according to an embodiment of the present invention.

An embodiment of the activation process is shown schematically in FIG. 7. Briefly, FIG. 7 depicts three servers in a cluster, server 700, server 710, and server 720. Server 700 is in the process of activation. The three servers are in communication through communication links or other means discussed above. Arrows and connections shown in FIG. 7 are intended to show the flow of information and are not intended to indicate physical or separate connections between servers. On activation, the node agent associated with server 700 broadcasts, step 730, an I am alive (I_AM_ALIVE) 525 message. In preferred embodiments, the I am alive (I_A-M_ALIVE) 525 message is sent on port 9090. The message is received by servers 710 and 720, as well as any other servers in the cluster (not shown). Other servers that are up, including server 710 and 720, respond with a digest message, step 740,—such as a message using digest opcode (DIGEST) 535. Once a server, such as server 710 or 720, has retrieved the digest, the server sends out, step 750, a peer (PEER) message, using the PEER opcode 530 to build its cluster membership list. On getting this message, server 700 invokes a digest request, step 760, for example using the digest (DIGEST) opcode 535 on the server having sent the peer (PEER) message (such as server 710 or 720). Cluster 700 is operationally ready once the bootstrap phase is over. It then broadcasts load information, step 770, for example using the load (LOAD) opcode 540 to servers in the cluster periodically, as dictated by load frequency field 650.

Accordingly, servers in a cluster maintain a list of assets that are available in the cluster and where they reside (generally by sending and receiving digest messages, updates, and asset insert or asset delete notifications). Generally, every streaming server within the cluster maintains an asset list, in some embodiments, only a subset of servers maintain an asset list, and in one embodiment, one server maintains an asset list. In some embodiments, therefore, the node agent caches a local asset directory of the assets that are available on the local server and also keeps an asset directory associated with each server in the cluster. The local directory is communicated to the rest of the servers during the activation phase, summarized above and in FIG. 7. When a server receives a request that it cannot service, or in some embodiments, when its load is greater than a threshold value, it consults these directories to select a server to forward the request.

The asset directories are advantageously compact and allow fast lookups, inserts and deletes. Accordingly, in preferred embodiments, asset directories are implemented as a Summary Cache, as known in the art and described further in, for example, "Summary Cache: A Scalable Wide-Area Web Cache Sharing Protocol", L. Fan, P. Cao, J. Almeida, and A. Broder IEEE/ACM Transactions on Networking 8(3): 281-293 (2000), hereby incorporated by reference herein. It will be readily appreciated by those skilled in the art that other structures could be employed to maintain an asset list at a server. Briefly, a Summary Cache represents a set of n elements as a bit vector of size n×m where m is referred to as the Bloom Load Factor. A set of hash functions that map into this range are chosen to support insertion, deletion, and membership queries. In a preferred embodiment, the node agent implements a Summary Cache with a Bloom Load Factor of 16 and 4 hash functions. However, a Bloom Load Factor of generally between 8 and 64 and between 2 and 8 hash functions can be used, although in some embodiments a greater or lesser number of either may be advantageous. The choice of the Bloom Load Factor and the number of hash functions is influenced by the acceptable probability of a false hit. A false hit occurs when the summary cache responds to a membership query by saying that the element exists but in reality it does not. For a Bloom Load Factor of 126 and 4 hash functions, the probability of a false hit is approximately a quarter of one percent. In some embodiments, the hash functions are built by first calculating the MD5 signature of the asset name, as known in the art. Recall that an MD5 signature hashes an arbitrary length string into a fixed length signature. In other embodiments, the hash functions are built by calculating the MD5 signature of some other string uniquely associated with the asset.

Figure 8:
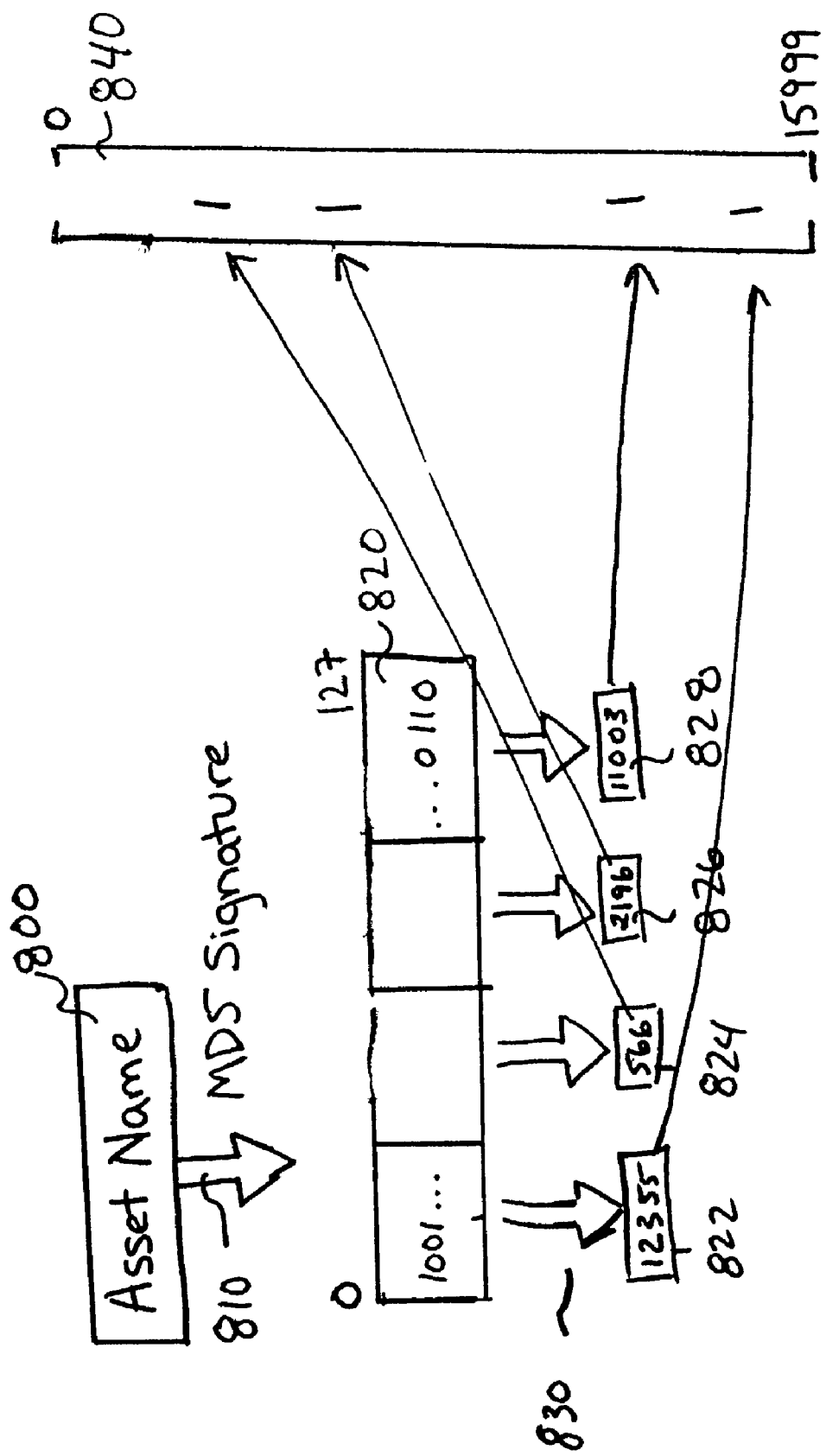
FIG. 8 is a diagrammatic illustration showing an embodiment of a method for calculating indices in a Summary Cache, according to an embodiment of the present invention.

One embodiment of a method for calculating indices in a Summary Cache is shown in FIG. 8. The MD5 signature of asset name 800 is calculated in step 810. The MD5 signature hashes an arbitrary length string into a 128-bit signature 820.

In other embodiments signature 820 is longer or shorter than 128 bits. The signature is then divided into four 32-bit integers (integers 822, 824, 826, and 828) using modulo n×m, in step 830. Integers 822, 824, 826, and 828 are used as the four hashes. That is, a '1' is entered in a position of summary cache 840 corresponding to locations given by integers 822, 824, 826, and 828. In preferred embodiments, the maximum number of assets on a server is set as a command line parameter. In a preferred embodiment, the maximum number of assets on a server is 1000, and the Summary Cache size is accordingly 1000×16, or 16000 bits. Accordingly, integers 822, 824, 826, and 828 in FIG. 8 are between 0 and 15999. The size of the Summary Cache, and accordingly the modulo number used in step 830 and the range of integer values for integers 822, 824, 826, and 828 will vary according to the number of assets on a server and the length of the signatures.

Assets that are installed or deleted once the cluster is operational generate notifications to the node agent. The node agent in turn communicates this information using asset insert (ASSET_INSERT) 545 or asset delete (ASSET_DELETE) 550 messages to the rest of the servers in the cluster. These messages broadcast indices to the Summary Cache that needs to be altered as a result of the installation or deletion of an asset.

As discussed briefly above, each server in a cluster calculates one or a plurality of factors associated with its load and broadcasts one or more load factors, or metrics, to other servers in the cluster. That is, each server periodically (or according to some other scheme or policy) extracts a load metric or metrics, computes a load factor or factors and broadcasts this information to servers in the cluster. Load metrics may include, for example, any one or combination of CPU idle time, CPU utilization, amount of free physical and swap memory, and network bandwidth utilized or available network bandwidth, or other load related metrics or measures. Each of these metrics may be converted into a load factor through any variety of scaling and normalization procedures. In one embodiment, a network bandwidth metric is calculated by determining the number of streams in use out of a known number of available streams. In a preferred embodiment, each metric is represented as a percentage and a plurality of metrics are summed and normalized to a number, an overall load factor, between 0 and 100 that reflects the overall load on the server. In some embodiments, a plurality of metrics are combined in a weighted sum. In some embodiments, higher numbers indicate greater loads. In other embodiments, lower numbers indicate greater loads. In other embodiments, a plurality of load factors are calculated, each for a different load metric or combination of metrics. Load information, comprising one or more load factors, is broadcast to other servers using a load message, such as ICP_LOAD 540, or other like message protocol. The same or different weightings may be applied to different of the metrics so that their relative importance in the overall metric may be accounted for.

Each server within a cluster further is configured, through program module node agent, to provide request forwarding. That is, on receiving a request for an asset, a first server checks to see if any of the following conditions are true: (1) the asset does not exist on the first server, or is not associated with the first server—that is, the first server does not have metadata associated with the asset, a prefix associated with the asset, or the asset itself residing on its direct storage, as appropriate with regard to the particular server configuration; (2) sufficient resources do not exist to stream the asset on or from the first server; or (3) the current load on the first server is over a threshold limit—that is a specified load factor exceeds a threshold limit, as discussed above. In some embodiments, the first server only checks if the asset does not exist on the first server and if sufficient resources do not exist to stream the asset on the first server; and a load threshold value is not checked. If any of these conditions is true, the server attempts to locate a second server in the cluster that has the asset and sufficient resources to stream the asset.

In a case where the server has the asset and the resources, but has a load factor exceeding a threshold limit, it will attempt to find another server that is less loaded (that is, has a load factor corresponding to a load less than the first server) and that has the asset. If it fails to locate another server, it will service the request. In some embodiments, the first server has a smaller overall load factor than a second server, but a greater load factor of a critical metric. That is in some embodiments, a first server will attempt to forward a request if a single load factor is greater than a threshold value corresponding to that load factor. In preferred embodiments, the first server attempts to forward the request when its overall load factor is greater than a threshold value.

Accordingly, servers within clusters according to the present invention may advantageously but optionally have a load thresholding feature. As discussed briefly above, a load threshold is a number corresponding to a threshold level for a load factor, discussed above. The load threshold represents the load factor level beyond which the server will consult the node agent to determine if there is a server that is less loaded than itself that would be able to service the request. In preferred embodiments, the load threshold value is a number between 0 and 100 and corresponds to the threshold level of an overall load factor, discussed above, representing a plurality of load metrics. In preferred embodiments, a load threshold value of between 20 and 50 is used. In some embodiments, a plurality of load threshold values are provided corresponding to a plurality of load factors and the first server attempts to locate a second, less loaded server when a predetermined number of load threshold values are exceeded. Accordingly, while operating over the load threshold, the cluster software, or program module, or node agent, adds a small overhead to the play request processing, as it has to determine the most appropriate server in the cluster to service the request. In other embodiments, load thresholding is not provided by the node agent. In still other embodiments, different load assessment and/or allocation techniques or procedures may be applied.

The load (LOAD) messages may advantageously double as heartbeats that are used for failure detection in some embodiments. That is, each server under normal operating conditions broadcasts load information, for example, using a LOAD message, at regular intervals given, for example, by load update frequency 651, or according to some other scheme or policy. In some embodiments, timers are programmed to trigger events in the case where there has been no communication between a pair of nodes for a certain length of time. The triggered event verifies if a server is out of service or is merely slow in responding. If a first server detects that a second server is down, it marks the second server as down and removes it from membership of the cluster. When it receives an I am alive (I_AM_ALIVE) 525 message from the server that went down, it includes it back into the cluster.

Figure 9:
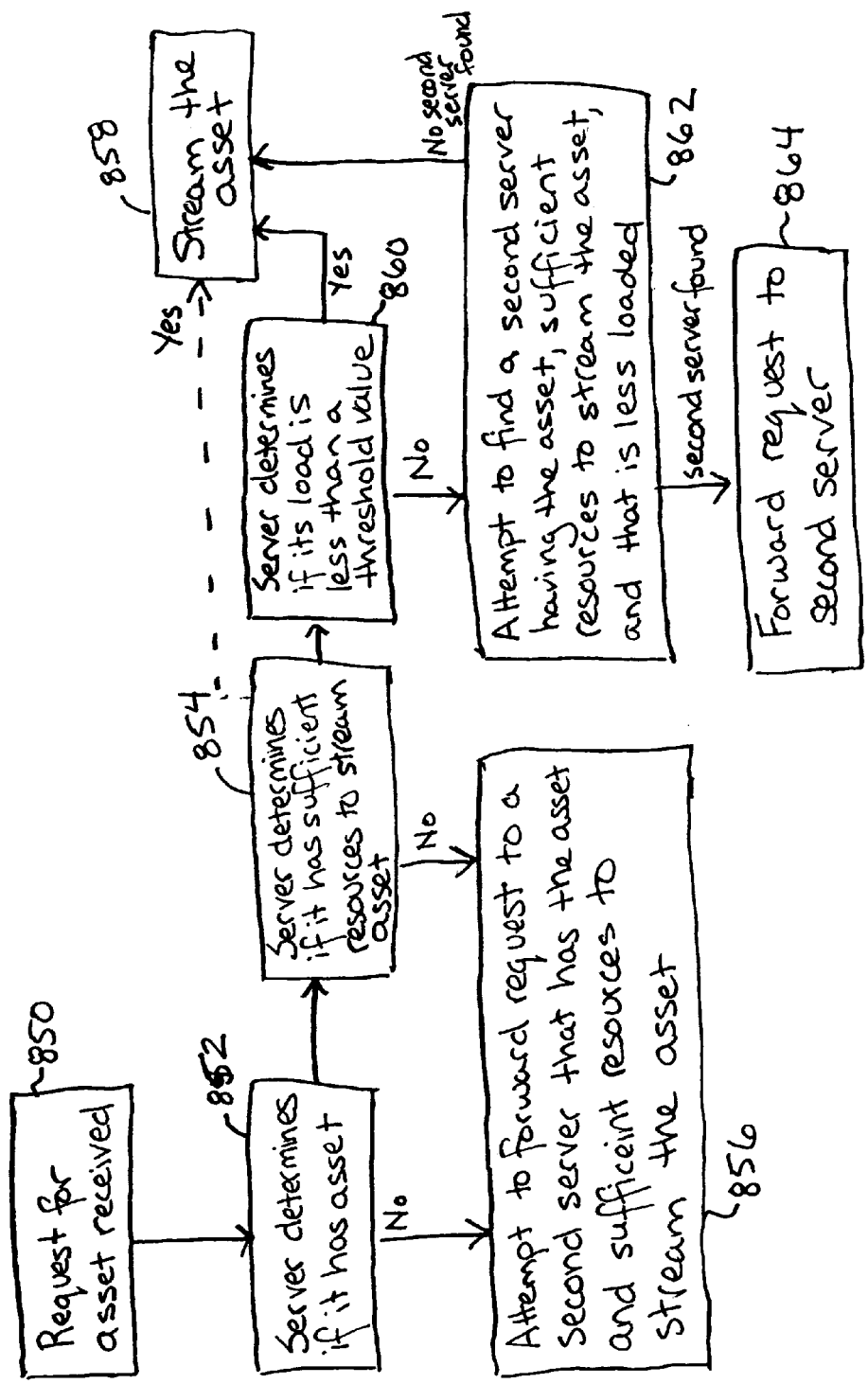
FIG. 9 is a schematic overview of one embodiment of a request forwarding procedure for a server in a cluster, according to one embodiment of the present invention.

FIG. 9 provides a schematic overview of one embodiment of a request forwarding procedure for a server in a cluster. A request for an asset is received in step 850. For example, referring back to FIG. 3, server 115 may receive a request for an asset in step 850. The following method continues to be discussed with reference to the cluster configuration shown in FIG. 3, however it is to be understood that the method is applicable to all cluster configurations described above. Server 115 determines, step 852, if it has the asset—that is, in embodiments using a configuration such as that in FIG. 3, server 115 determines if asset information associated with the requested asset is stored on storage device 118. In step 854, the server (such as server 115) determines if it has sufficient resources to stream the asset. In other embodiments, the decisions are made in a different order. If the server either does not have the requested asset or does not have sufficient resources to stream the asset, the server (such as server 115) will attempt to forward the request (step 856) to a second server (such as server 110) that does have the asset and sufficient resources to stream. In some embodiments, if the server has the requested asset and sufficient resources to stream, the server will simply stream the asset (step 858). In other embodiments, the server then determines if its load is less than a threshold value, step 860, as discussed above, and streams the asset (step 858) if the load is sufficiently light. If the load exceeds a threshold value, than the server attempts to find a second server having the asset, sufficient resources to stream, and that is less loaded, step 862. If the server finds such a second server, it forwards the request (step 864), and if not, the first server will stream the asset (step 858). In other embodiments, the first server gives preference in step 862 to servers having the complete asset rather that servers having a prefix or other portion of the asset.

The request forwarding capabilities provided by the node agent—described above and in FIG. 9—allow load-balancing components, such as a Layer 4 switch, to optionally be eliminated. That is, in preferred embodiments, a load-balancing component is not present to direct user requests to a particular server within a cluster. Instead, user requests may enter the cluster at one or a plurality of servers, and the individual servers themselves forward the requests as necessary. In other embodiments, a load-balancing component, such as a Layer 4 switch, is utilized to distribute requests.

Figure 10:
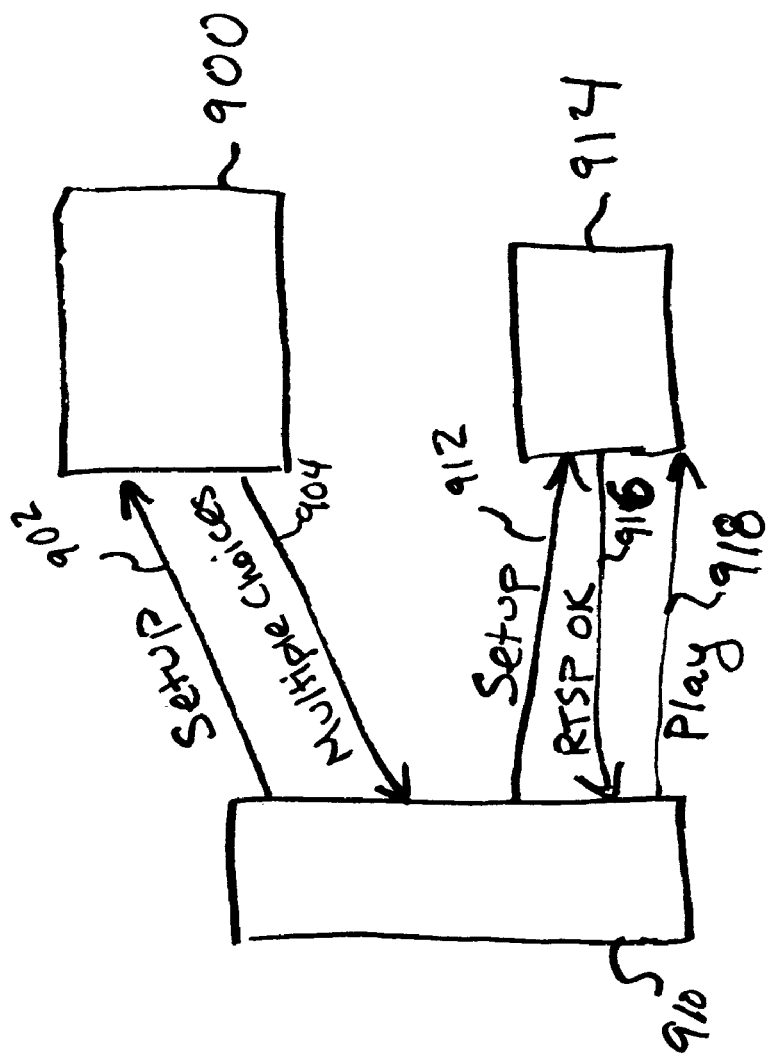
FIG. 10 is a diagrammatic illustration showing a control flow when a play request is forwarded using RTSP, according to an embodiment of the present invention.

FIGS. 10 depicts a schematic overview of a control flow when a play request is forwarded. FIG. 10 depicts an embodiment using RTSP (Real Time Streaming Protocol) request forwarding. It will be understood by those skilled in the art after reading this specification that other protocols may be used. Referring to FIG. 10, server 900 in a cluster receives an RTSP Setup call, step 902, and decides to load balance according to one or more of the criteria above, by forwarding the request. Therefore, server 900 responds with an RTSP Multiple Choices message (step 904). Included with the RTSP Multiple Choices message is the name of an alternate server in the cluster that, in one embodiment, is the least loaded server that has the requested asset. Client 910 now makes an RTSP Setup call (step 912) to the new server, such as server 914. On a successful setup, server 914 responds with an RTSP OK message (step 916). Client 910 can now play the asset (step 918) from the second server.

The present invention further advantageously but optionally provides methods, procedures, and computer programs and computer program products for hot or high demand asset load balancing. Briefly, an asset (such as a feature video movie or motion picture) is said to be hot when usage statistics indicate a spike or other high-demand condition in the number of requests for that asset. Generally, a spike means a flurry of requests in a short period of time. Accordingly, servers in clusters of the present invention are configured to provide a hot asset trigger through the computer program module, or node agent, installed therein. In a preferred embodiment, the hot asset trigger, represented by hot asset count 630 and hot asset period 640, is set by an administrator. In other embodiments, hot asset count 630 and hot asset period 640 are dynamically selected and/or updated by the node agent, or by the server itself. The trigger is fired or released when the number of requests for an asset within hot asset period 640 exceeds hot asset count 630. In other embodiments, the trigger is fired when the number of requests for an asset within hot asset period 640 equals or exceeds hot asset count 630. Once the trigger is fired, that is, if the number of requests for an asset within hot asset period 640 equals or exceeds hot asset count 630, the node agent will replicate the asset to the least lightly loaded server in the cluster (or some other server in the cluster that has capacity to serve according to some scheme or policy) that does not have that asset. In some embodiments, a service wrapper is provided, a video transfer service, that provides video content delivery functionality. This wrapper, or video transfer service, provides a computer program module containing instructions to replicate an asset.

In some embodiments, the entire asset is not replicated to another server not having the asset once the asset is considered 'hot', rather, a variable length prefix of the asset is replicated to another server. Generally, a prefix of an asset comprises between 5 and 50 percent of the asset, although in some embodiments a larger or shorter prefix may be transferred. This is referred to as prefix caching. Embodiments of prefix caching for media objects are described in copending U.S. patent application Ser. No. 09/774,204 filed Jan. 29, 2001 and entitled Prefix Caching for Media Objects, herein incorporated by reference.

When a second server having a variable prefix of an asset receives a request for that asset and conditions are suitable for the second server to service that request, it begins playout of the prefix and requests transfer of the entire asset from a server having the asset, or from a centralized storage location, depending on the configuration of the cluster. In still other embodiments, the entire asset is not replicated to another server not having the asset once the asset is considered 'hot', rather, metadata associated with the asset is replicated to another server, and the server requests a copy of the entire asset upon receiving a serviceable request.

A Cluster Management Console may be provided to allow an administrator to effectively manage a cluster. The Cluster Management Console is generally a centralized tool to define, configure, administer and monitor the servers in a cluster. The Console collects server information, asset information, and load and stream counts, and presents the information or data in an easy to view format. An administrator can then use this information to move and replicate assets, add or remove servers, adjust parameters to keep the cluster running at idea performance, and the like. Generally, then, the Cluster Management Console provides all or a subset of the following functionalities: defining a cluster; adding and/or removing servers from a cluster; activating and/or deactivating servers in a cluster; configuring cluster parameters; displaying server information, cluster configuration, asset listings, SNMP events, and the like; displaying system error, warnings, and the like by enabling SNMP traps; monitoring server load, active stream counts, asset requests, and hot objects; administering a server using the administrative web graphical user interface; logging in to a cluster; and playing out, transferring, listing locations of replicated assets, renaming and deleting assets.

In some embodiments, clusters of the present invention are configured to support a single signon feature. That is, when servers in a cluster are operating with A4 services (Authentication, Authorization, Access Control and Accounting) enabled, the server is a secure server an only those authorized by a successful login may be able to play out assets, and it may become inconvenient for an administrator to have to log on to each of the servers separately. The Single Sign On feature allows an administrator to log on once to a cluster using a Cluster Management Console, and be able to administer any of the servers in the cluster without having to log on separately. Once an administrator logs on to a cluster using the Console, the user credentials are passed along with any administer or play requests. The Console can be implemented as a program module having a variety of formats, such as for example, a Java Applet. In some embodiments, the Console is installed on a server within a cluster. In other embodiments, the Cluster Management Console resides on a computer or other device having a processor and in communication with a server or servers in the cluster.

Figure 11:
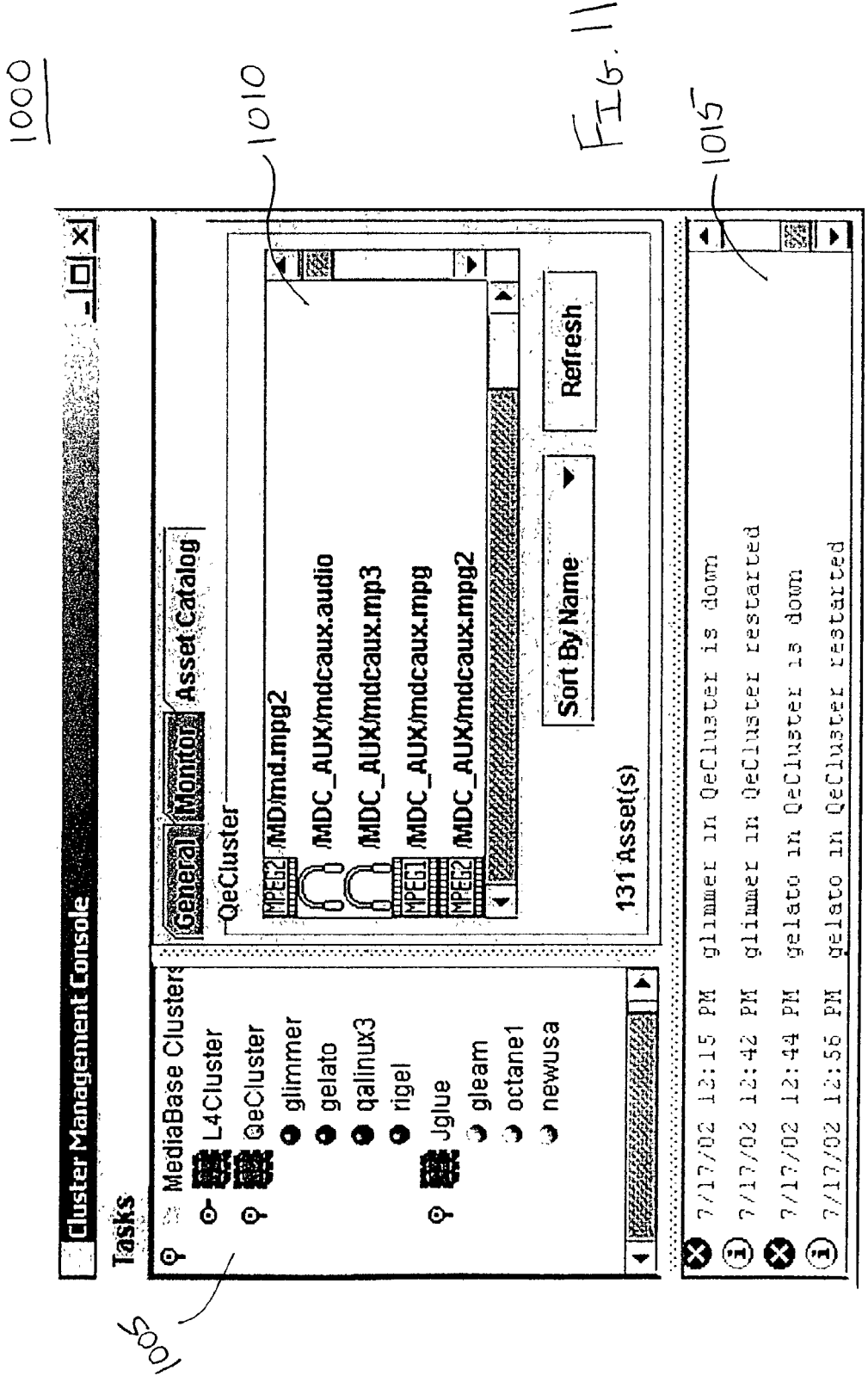
FIG. 11 is an illustration of a graphical appearance of one aspect of the cluster management console, according to an embodiment of the present invention.

One embodiment of the graphical appearance of console view 1000 is shown in FIG. 11. Console view 1000 comprises Cluster View pane 1005, Server View pane 1010, and Message pane 1015. Cluster View pane 1005 is used to define new clusters, add and delete servers in a cluster and to brows different clusters and servers that are part of each cluster. For example, Cluster View pane 1005 shows three clusters—a first cluster (L4Cluster), a second cluster (QeCluster), and a third cluster (Jglue). Where 'L4Cluster', 'Qecluster', and 'Jglue' represent arbitrary cluster names.

Servers in any or each cluster can be viewed—for example, 'QeCluster' comprises servers 'glimmer', 'gelato', 'qalinux3', and 'rigel', in FIG. 11, where server 'glimmer', 'gelato', 'qalinux3', and 'rigel' are names assigned to the particular servers, respectively. Server View pane 1010 provides detailed information about servers and buttons for monitoring various cluster-wide data. For example, Server View Pane 1010 has buttons to view general information, monitor information, and asset catalog information. As shown, Server View pane 1010 displays asset catalog information including assets contained in cluster 'Qecluster'. Message pane 1015 is used for informational messages, and for notification of warnings or critical events. As shown, Message pane 1015 displays several messages, including that 'gelato' in 'Qecluster' was restarted. The date and time of the messages may also be shown.

The Console can be used to view multiple clusters, as shown in FIG. 11. In preferred embodiments, an administrator defining a cluster would create views in console 1000 that reflect physical clusters, as described above. In other embodiments, views in Console 1000 do not reflect physical clusters.

Figure 12:
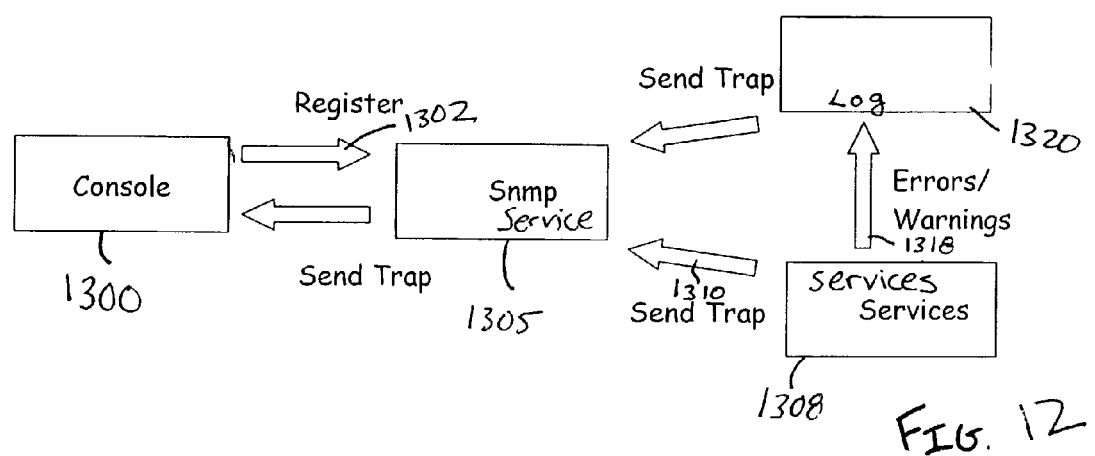
FIG. 12 schematically depicts a process through which events (traps) are propagated to the Cluster Console, according to an embodiment of the present invention.

Critical errors, warning, asynchronous event notifications (hot object transfer completion, for example), and the like are reported back to the Cluster Management Console as SNMP traps. An administrator using the Console is accordingly informed about such events on any server in a cluster and if needed can then take appropriate action. FIG. 12 schematically depicts one embodiment of how asynchronous events (traps) are propagated to the Cluster Console. These traps are errors or warnings that are generated in the cluster, that may require immediate attention, or meet some other criteria. Console 1300 registers (step 1302) with SNMP Service 1305. SNMP Service 1305 implements the Simple Network Management Protocol (SNMP) and acts like a central clearing house for traps. Service 1308, such as a node agent, or other computer program module, or plurality of services, generate traps that are sent (step 1310) to SNMP Service 1305. On receiving a trap, SNMP Service 1305 forwards the trap to Console 1300 which then displays the message. Additionally, in some embodiments, services 1308 send, step 1318, error or warning messages to log 1320. Log 1320 may further send traps, step 1322, to SNMPService 1305.

Figure 13:
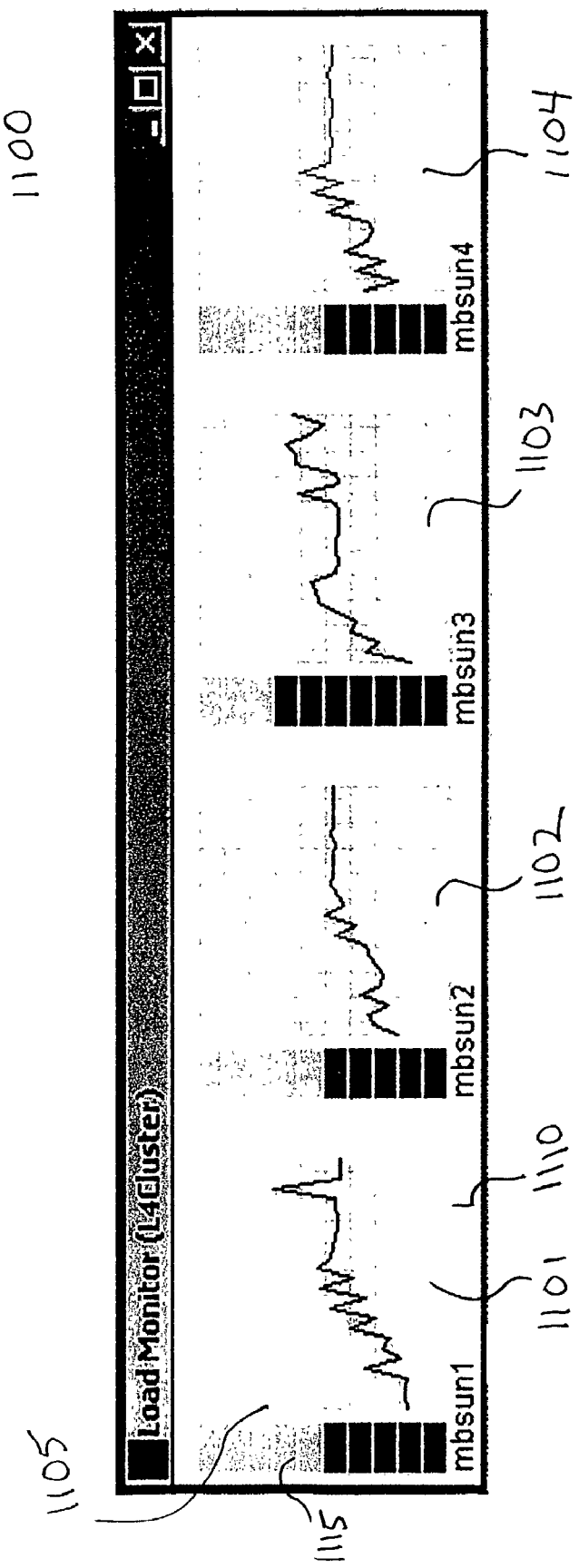
FIG. 13 depicts a Load Monitor displayable by the Console, according an embodiment of the present invention.
Figure 14:
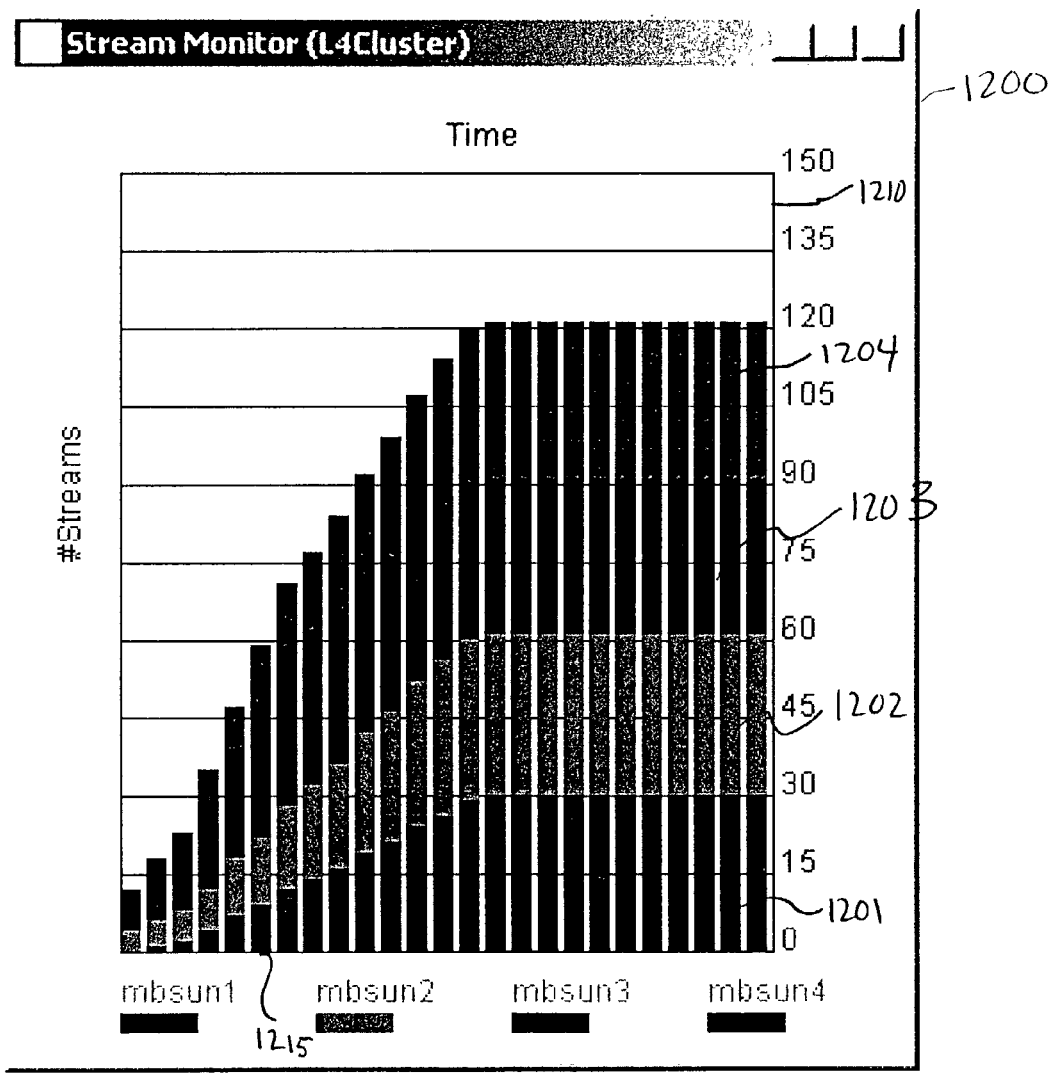
FIG. 14 depicts a stream monitor displayable on the console, according to an embodiment of the present invention.

The Cluster Management Console further allows for monitoring of server load, cluster-wide active stream counts, and asset popularity. In addition, playout status, disk status, network status, and the like can be monitored if the appropriate SNMP agent is running on the desired servers. FIG. 13 depicts one embodiment of a Load Monitor displayable by the Console. Load Monitor 1100 displays four load graphs 1101, 1102, 1103, and 1104—each corresponding to a different server. Y-axis 1105 represents a load factor, discussed above, and X-axis 1110 represents time. Bar scale 1115 gives another depiction of load level. FIG. 14 depicts one embodiment of a stream monitor displayable on the console. Stream monitor 1200 depicts information associated with three servers—1201, 1202, 1203, and 1204 in an additive manner such that the total number of streams playing can also be viewed. Y-axis 1210 represents number of streams, while X-axis 1215 represents time.

Clusters according to the present invention further maintain counters that allow an administrator to view or ascertain operational health of the cluster. Generally, each server maintains some or all of the counters described below. In other embodiments, counters are shared. In some embodiments, counter information is aggregated and displayed by the Cluster Management Console, described above, that contacts each of the servers in the cluster. Exemplary counters, all or some of which may be implemented in a particular cluster are: (1) an asset not cached counter (AssetNotCached) that is incremented when a server receives a request for an asset that is not installed locally; (2) an asset not in cluster counter (AssetNotinCluster) that is incremented when a server receives a request for an asset that is not installed locally and also is unable to find it anywhere in the cluster; (3) a resources unavailable counter (ResourcesUnavailable) that is incremented when a server receives a play request for an asset that is installed locally, but the server does not have the resources to play the request; (4) a first try counter (FirstTry) that is incremented when a server looks for an alternate server to service a play request and finds one in the first try; (5) a second try counter (SecondTry) that is analogous to the first try counter (FirstTry), but in this case it takes two attempts to find an alternate server to service the request. If this counter is rapidly increasing, one possibility is that the load information is not being exchanged frequently enough; (6) a three or more counter (ThreeOrMore) that is incremented when it takes more than two requests to service a request(this counter may further indicate a need to change the load update frequency); (7) an out of cluster resources counter (OutOfClusterResources) that is incremented when a server receives a request for an asset that it cannot service but also finds out that no other server in the cluster can service the request (this counter may indicate the cluster is operating at peak capacity and more servers may need to be added to the cluster if this counter is rapidly increasing); (8) an ICP messages counter (ICPMessages) that is incremented when a server receives an ICP_QUERY message from a cache, inquiring about the presence of an asset; (9) an ICP hits counter (IcpHits) that is incremented when a server responds to an ICP_QUERY message with an ICP_HIT message (the server responds with an ICP_HIT message when the requested asset is present in the cluster); (10) an asset inserts counter (Assetinserts) that is incremented when an asset is installed at the server; (11) an asset deletes counter (AssetDeletes) that is incremented when an asset is deleted from a server; and (12) a false hits counter (FalseHits) that is incremented when a server receives a request to play an asset from another server in the cluster but the receiver does not have the requested asset (false hits lead to more messages and increase the response times).

The invention may advantageously implement the methods and procedures described herein on a general purpose or special purpose computing device, such as a device having a processor for executing computer program code instructions and a memory coupled to the processor for storing data and/or commands. It will be appreciated that the computing device may be a single computer or a plurality of networked computers and that the several procedures associated with implementing the methods and procedures described herein may be implemented on one or a plurality of computing devices. In some embodiments the inventive procedures and methods are implemented on standard server-client network infrastructures with the inventive features added on top of such infrastructure or compatible therewith.

The invention also provides a business model and method for distribution of content and assets (such as video movies) as well as a business model and method for operating and growing a scalable content and asset distribution system.

In one embodiment, the invention provides a business model for operating a time-base accurate asset streaming business including: operating a first server to receive and service requests for an asset, the first server (i) receiving a request for an asset, (ii) determining if the first server has the asset available for time-base accurately streaming and has sufficient resources to time-base accurately stream the asset, and (iii) time-base accurately streaming the asset if it is determined that the first server has the asset available for time-base accurately streaming and has sufficient resources to time-base accurately stream the asset; and if the determining indicates that the first server does not have the asset available for time-base accurately streaming or does not have sufficient resources to time-base accurately stream the asset, then: (i) identifying a second server having the asset available for time-base accurately streaming and sufficient resources to time-base accurately stream the asset, and (ii) forwarding the request to the identified second server for servicing by the second server. This asset may for example comprises a multimedia asset such as for example a video movie or other asset type described herein.

Embodiments of the business model and method may include or utilize features of the inventive system, method, procedures and computer program and computer program product described elsewhere herein and not separately described relative to the inventive business model and method.

The foregoing descriptions of specific embodiments and best mode of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. A server system for time-based media streaming comprising:
   a plurality of servers coupled for communication with each other, said plurality of servers including a first server; and
   a computer readable storage medium at said first server storing therein asset information that is replicated in a computer readable storage medium associated with at least one other server;
   wherein said first server is configured to:
      receive a request for an asset from a client coupled to the server system;
      determine if the request should be forwarded to another server before responding to the client, wherein said determination is based on existence of at least one of a plurality of conditions consisting of:
         that the asset does not exist at the first server;
         that sufficient resources do not exist to stream the asset from the first server; and
         that a current load on the first server is over a threshold limit;
      find in the server system a second server capable of streaming the asset in response to the determination that the request should be forwarded;
      cause the request from the client to be sent to the second server after the second server is located; and
      determine if said asset is a hot asset, and if said asset is determined to be a hot asset, then copying information associated with said asset to said second server including copying at least one of: (a) a prefix of said asset to said second server, and (b) copying the asset to the second server and streaming the prefix of the asset from the second server.

2. A server system according to claim 1, wherein each server is further configured to periodically calculate at least one load factor corresponding to the server and broadcast the at least one load factor to other servers in the server system.

3. A server system according to claim 2, wherein each server is further configured to store load factors received from other servers, and wherein said second server is the least loaded among servers having the asset according to load factors stored at the first server.

4. A server system according to claim 2, wherein the at least one load factor corresponding to each server comprises an overall load factor.

5. A server system according to claim 4, wherein said overall load factor is computed based on information chosen from the group consisting of: percent CPU used, memory used, network bandwidth available, and combinations thereof.

6. A server system according to claim 2 wherein each server in the server system stores a load update frequency indicating how often the server is to calculate the at least one load factor corresponding to the server and broadcast the at least one load factor to other servers in the server system.

7. A server system according to claim 1, further comprising a network switch coupled between the client and the plurality of servers.

8. A server system according to claim 1, wherein said asset comprises an audio or a video.

9. A server system according to claim 8, wherein said video comprises a movie video in MPEG-2 format for playback at 30 frames/second.

10. A server system according to claim 1, wherein each server is configured to broadcast an asset insert message to other servers in response to an asset being inserted in asset information stored at the server and to broadcast an asset delete message to other servers in response to an asset being removed from the asset information stored at the server.

11. A server system according to claim 1, wherein said asset information comprises metadata associated with an asset.

12. A server system according to claim 11, further comprising a shared storage system, wherein said shared storage system stores a plurality of media assets and each server comprises a computer storage device storing therein metadata associated with at least one of said plurality of media assets.

13. A server system according to claim 1, wherein each server in the server system stores a load threshold value.

14. A server system according to claim 1, wherein each server in the server system is further configured to communicate during an activation phase a list of assets stored at the server to other servers in the server system.

15. A server system according to claim 14, wherein each server having part of an asset stored at the server is configured to respond to a request for the asset by requesting transfer of the asset while streaming the part of the asset.

16. A server system according to claim 1, wherein said first server stores a hot asset count value and is further configured to keep track of received requests for assets and to replicate all or part of an asset to another server in response to a determination that a number of received requests for the asset exceeds the hot asset count value.

17. A server system according to claim 1, wherein said first server stores a hot asset count value and a hot asset period and is further configured to keep track of received requests for assets and to replicate part or all of the asset to another server in response to a determination that a number of received requests for the asset during a period equal in length to the hot asset period exceeds the hot asset count value.

18. A server system according to claim 1, further comprising a cluster management console configured to collect server information, asset information, load information and active stream counts associated with each server in the server system, the cluster management console being further configure to define the server system, add server to the server system, delete a server from the server system, and monitor asset requests and hot objects.

19. A server system according to claim 1, wherein said first server is further configured to cause the request from the client to be sent to the second server by informing the client to send the request to the second server.

20. A server system according to claim 1, wherein said time-based media streaming comprises real-time media streaming.

21. A server system according to claim 1, wherein said plurality of servers form a peer-to-peer server network.

22. A method for time-based streaming of assets, said method comprising:
    receiving a request from a client for an asset at a first server;
    determining, prior to streaming said asset, if said first server has said asset and if said first server has sufficient resources to stream said asset;
    if said first server does not have said asset, or said first server does not have sufficient resources to stream said asset, attempting to identify a second server having said asset and sufficient resources to stream said asset;
    informing the client to send the request directly to said identified second server prior to streaming said asset; and
    determining if said asset is a hot asset, and if said asset is determined to be a hot asset, then copying information associated with said asset to said second server including copying at least one of: (a) a prefix of said asset to said second server, and (b) copying the asset to the second server and streaming the prefix of the asset from the second server.

23. A method for time-based streaming of assets and load-balancing, said method comprising:
    receiving a request from a client for an asset at a first server having said asset and sufficient resources to stream said asset;
    determining if said first server has a first server load level greater than a load threshold level; and
    in response to the determination that said first server has a first server load level greater than a load threshold level:
        attempting, prior to streaming said asset, to find a second server having said asset, sufficient resources to stream said asset, and a second server load level less than said first server load level;
        informing the client to send the request to said second server if said second server is located; or streaming said asset while maintaining a time-base for said streamed asset if said second server is not located
    determining if said asset is a hot asset, and if said asset is determined to be a hot asset, then copying information associated with said asset to said second server including copying at least one of: (a) a prefix of said asset to said second server, and (b) copying the asset to the second server and streaming the prefix of the asset from the second server.

24. A method according to claim 23, wherein said load threshold level is predetermined and adjustable.

25. A method according to claim 23, further comprising periodically calculating said first server load level and broadcasting said first server load level to other servers including the second server.

26. A method for time-based streaming of assets performed by a first server in a server system comprising a plurality of servers, said method comprising:
    receiving a request for an asset from a client;
    determining prior to responding to the client if said first server has said asset and if said first server has sufficient resources to stream said asset;
    if said first server has said asset and sufficient resources to stream said asset, determining if said first server has a load level less than a load threshold value; and
    if said first server has a first server load level greater than a load threshold level, attempting, prior to streaming said asset, to locate a second server having said asset, sufficient resources to stream said asset, and a second server load level less than said first server load level; and
        (i) informing the client to send the request to said second server if said second server is located; or (ii) streaming said asset if said second server is not located; and
    determining if said asset is a hot asset, and if said asset is determined to be a hot asset, then copying information associated with said asset to said second server including copying at least one of: (a) a prefix of said asset to said second server, and (b) copying the asset to the second server and streaming the prefix of the asset from the second server.

27. A method according to claim 26, wherein said load threshold level is predetermined and adjustable.

28. A method according to claim 27, further comprising periodically calculating said first server load level and broadcasting said first server load level to other servers including the second server.

29. A method according to claim 26, wherein said determining if said asset is hot comprises determining if a number of requests for said asset during a predetermined hot asset period exceeds a predetermined hot asset count.

30. A method according to claim 26, wherein said determining if said asset is hot comprises determining if a number of requests for said asset during a predetermined hot asset period equals or exceeds a predetermined hot asset count.

31. A method according to claim 26, wherein said copying information comprises copying metadata associated with said asset to said second server.

32. A method according to claim 26, wherein said detennining if said asset exists at said first sewer comprises determining if information about said asset is stored in a first computer readable storage medium associated with said first server.

33. A method according to claim 32, wherein said information about said asset comprises information selected from the group consisting of said asset, metadata associated with said asset, a prefix of said asset, and combinations thereof.

34. A method according to claim 26, wherein said first server has said asset if all or a portion of said asset exists at said first server, said method further comprising:
requesting transfer of said asset from another server to said first server.

35. A method according to claim 26, wherein a part of said asset exists at said first server, said method further comprising:
requesting transfer of said asset from a centralized storage system to said first server.

36. A computer program product for use in conjunction with a first server having at least one processor and a memory coupled to the processor, the first server being in communication with at least one second server, the computer program product comprising a computer readable storage medium and a computer program mechanism embedded therein, the computer program mechanism comprising:
a program module that directs the first server to function in a specified manner to provide load-balancing functionality upon receiving a request for an asset from a client, the program module including instructions for:
determining prior to responding to the client if said first server has said asset and if said first server has sufficient resources to stream said asset;
if said first server does not have said asset, or said first server does not have sufficient resources to stream said asset, attempting, prior to streaming said asset, to identify a second server having said asset and sufficient resources to stream said asset;
informing the client to send the request to said identified second server; and
determining if said asset is a hot asset, and if said asset is determined to he a hot asset, then copying information associated with said asset to said second server including copying at least one of: (a) a prefix of said asset to said second server, and (b) copying the asset to the second server and streaming the prefix of the asset from the second server.

37. A computer program product for use in conjunction with a first server having at least one processor and a memory coupled to the processor, the first server being in communication with at least one second server, the computer program product comprising a computer readable storage medium and a computer program mechanism embedded therein, the computer program mechanism comprising:
a program module that directs the first server to function in a specified manner to provide load-balancing functionality upon receiving a request for an asset from a client wherein said first server has said asset and sufficient resources to stream said asset, the program module including instructions for:
determining prior to responding to the client if said first server has a first server load level less than a load threshold value; and
if said first server has a load level greater than a load threshold level, said method further comprising:
attempting, prior to streaming said asset, to locate a second server having said asset, sufficient resources to stream said asset, and a second server load level less than said first server load; and
(i) informing the client to send the request to said second server if said second server is located; or (ii) streaming said request if said server is not located; and
determining if said asset is a hot asset, and if said asset is determined to be a hot asset, then copying information associated with said asset to said second server including copying at least one of: (a) a prefix of said asset to said second server. and (b) copying the asset to the second server and streaming the prefix of the asset from the second server.

38. The computer program product of claim 37, wherein said program module further includes instructions for periodically:
calculating the first server load level; and
sending or broadcasting the first server load level to other servers including said second server.

39. A computer program product for use in conjunction with a first server having at least one processor and a memory coupled to the processor, the first server being in communication with at least one second server, the computer program product comprising a computer readable storage medium and a computer program mechanism embedded therein, the computer program mechanism, comprising:
a program module that directs the first server to function in a specified manner to provide load-balancing functionality upon receiving a request for an asset from a client, the program module including instructions for:
determining prior to responding to the client if said first server has said asset and if said first server has sufficient resources to stream said asset;
if said first server has said asset and sufficient resources to stream said asset, determining if said first server has a load level less than a load threshold value; and
if said first server has a load level greater than a load threshold level, attempting, prior to streaming said asset, to find a second server having said asset; sufficient resources to stream said asset, and a second server load level less than said first server load level; and
(i) informing the client to send the request to the second server if said second server is located; or (ii) streaming said request if said second server is not located; and
determining if said asset is a hot asset, and if said asset is determined to be a hot asset, then copying information associatcd with said asset to said second server including copying at least one of: (a) a prefix of said asset to said second server, and (b) conying the asset to the second server and streaming the prefix of the asset from the second server.

40. The computer program product of claim 39, wherein said program module further includes instructions for:
periodically calculating said first server load level and sending or broadcasting said first server load level to other servers including the second server.

41. A server system for time-based media streaming comprising:
a plurality of servers coupled for communication with each other, including a first server, said first server comprising:
a first computer-readable storage medium encoded with server information comprising asset information that is replicated in server information stored in at least one other server; and a computer program mechanism, the computer program mechanism, comprising:
a program module that directs the first server to function in a specified manner to provide load-balancing functionality upon receiving a request for an asset from a client and prior to responding to the client, the program module including instructions for:

determining if said first server has said asset;

determining if said first server has sufficient resources to stream said asset;

if said first server does not have said asset or said first server does not have sufficient resources to stream said asset, informing the client to send said request to a second server, the second server having said asset and sufficient resources to stream said asset; or if said first server has said asset and sufficient resources to stream said asset, determining if said first server has a load level less than a load threshold value;

if said first server has a first server load level less than a load threshold value, streaming said asset; and if said first server has a load level greater than a load threshold level, attempting, prior to streaming said asset, to locate a second server having said asset, sufficient resources to stream said asset, and a second server load level less than said first server load level;

(i) forwarding said request, prior to streaming said asset, if said second server is located; and (ii) streaming said request if said second server is not located; and determining if said asset is a hot asset, and if said asset is determined to be a hot asset, then copying information associated with said asset to said second server including copying at least one of: (a) a prefix of said asset to said second server, and (b) copying the asset to the second server and streaming the prefix of the asset from the second server.

42. The server system for time-based media streaming in claim 41, wherein said time-based media streaming comprises maintaining streaming of said media within a predetermined play rate range.

43. The server system for time-based media streaming in claim 41, wherein said time-based media streaming comprises maintaining streaming of said media within a predetermined play rate range, and maintaining said media play within a predetermined delay relative to an absolute time reference.

44. The server system for time-based media streaming in claim 41, wherein said time-based media streaming comprises real-time media streaming.

45. A method for operating a time-base accurate asset streaming business, said method comprising:

operating a plurality of servers each configured to receive and service requests for assets from clients of said business, said operating step comprising:

operating a first server to determine if a received request for an asset from a client should be forwarded to another server prior to responding to the client based on existence of at least one of a plurality of conditions consisting of:

that the asset does not exist at the server;

that sufficient resources do not exist to stream the asset in real time from the server; and that a current load on the server is over a threshold limit;

operating said first server to find a second server in the server system in response to the determination that the request should be forwarded;

operating said first server to inform the client to send the request to the second server after the second server is found; and determining if said asset is a hot asset, and if said asset is determined to be a hot asset, then copying information associated with said asset to said second server including copying at least one of: (a) a prefix of said asset to said second server, and (b) copying the asset to the second server and streaming the prefix of the asset from the second server.

46. The method for operating a time-base accurate asset streaming business as in claim 45, wherein said operating a plurality of servers further comprises operating each server to periodically calculate at least one load factor indicating a current load at the server and send or broadcast the at least one load factor to other servers.

47. The method for operating a time-based accurate asset streaming business as in claim 45, wherein said determining if said first server has sufficient resources to stream said asset in real-time includes performing first server load assessment.

48. The method for operating a time-based accurate asset streaming business as in claim 45, wherein said operating a plurality of servers further comprises storing assets at each server and operating each server to broadcast an asset insert message to other servers in response to an asset being added at the server and to broadcast an asset delete message to other servers in response to an asset being removed at the server.

49. The method for operating a time-based accurate asset streaming business as in claim 48, wherein said operating a plurality of servers further comprises operating each server to communicate a list of assets stored at the server to other servers.

50. The method for operating a time-based accurate asset streaming business as in claim 45, wherein said operating a plurality of servers further comprises operating each server to determine if an asset is hot based on a number of received requests for the asset within a predetermined period and to copy the asset or a prefix of the asset to at least one other server in response to the determination that the asset is hot.

51. The method for operating a time-based accurate asset streaming business as in claim 45, wherein said operating a plurality of servers further comprises operating each server to request transfer of an asset from another server in response to receiving a request for the asset and a determination that a part of the asset is stored at the server.

52. In a server system comprising a plurality of servers for time-based media streaming, a method performed by a first server in the server system, the method comprising:

receiving a request for an asset from a client coupled to the plurality of servers;

determining if the request should be forwarded to another server before responding to the client based whether at least one of a plurality of conditions exists, said plurality of conditions consisting of:

that the asset does not exist at the server;

that sufficient resources do not exist to stream the asset from the server; and that a current load on the server is over a threshold limit;

finding a second sewer in the server system in response to the determination that the request should be forwarded;

causing the request from the client to be sent to the second server after the second sewer is found; and determining if said asset is a hot asset, and if said asset is determined to be a hot asset, then copying information associated with said asset to said second server including copying at least one of: (a) a prefix of said asset to said second server and (b) copying the asset to the second server and streaming the prefix of the asset from the second server.

53. A method according to claim 52, further comprising periodically calculating at least one load factor corresponding to the first sewer and sending or broadcasting the at least one load factor to other servers in the server system, and storing load factors received from other servers, wherein finding a second sewer further comprises finding the second sewer that is the least loaded among sewers having the asset according to load factors stored at the first server.

54. A method according to claim 53, wherein causing the request from the client to be sent to the second sewer comprises informing the client to send the request to the second server.

55. A method according to claim 53, wherein the first server in the server system stores a hot asset count value, the method further comprising determining if a number of received requests for the asset during a predetermined period exceeds the hot asset count value and replicating the asset or a variable length prefix of the asset to another server in response to a determination that the number exceeds the hot asset count value.

56. A method according to claim 52, wherein the first server comprises a computer storage medium storing therein asset information, the method further comprising sending or broadcasting an asset insert message to other sewers in response to an asset being inserted in the asset information and to broadcasting an asset delete message to other sewers in response to an asset being removed from the asset information.

57. A method for time-based media streaming, the method comprising:

at a first server in a cluster, receiving a request for a streaming session of a time-based media asset from a client, the asset having a prefix portion and a remainder portion;

at the first server, identifying a second server in the cluster having at least the prefix portion of the asset;

at the first server, receiving load information from the second server;

determining at the first server, based on load information associated with the first server and the received load information from the second server, whether to forward the request to the second server before responding to the client;

from the first server, transmitting a message to the client instructing the client to request streaming of the prefix of the time-based media asset from the second server; and determining if said asset is a hot asset, and if said asset is determined to be a hot asset, then copying information associated with said asset to said second server including copying at least one of: (a) a prefix of said asset to said second server, and (b) copying the asset to the second server and stream in the prefix of the asset from the second server.

58. The method of claim 57, wherein the message transmitted from the first server to the client comprises the name of the second server in the cluster.

59. The method of claim 58, wherein the second server is determined to be a server in the cluster with a least load with respect other servers in the cluster.

60. The method of claim 58, further comprising receiving at the second server a setup call from the client.

61. The method of claim 60, wherein the setup call comprises a message from the client causing the second server to allocate resources for a stream and start a time-based streaming session with the client.

* * * * *